United States Patent [19]
Jones, Jr.

[11] Patent Number: 5,113,375
[45] Date of Patent: May 12, 1992

[54] METHOD AND APPARATUS FOR TESTING GEOPHONES

[75] Inventor: Leslie Jones, Jr., Houston, Tex.

[73] Assignee: Chevron Research Company, San Francisco, Calif.

[21] Appl. No.: 615,564

[22] Filed: Nov. 19, 1990

Related U.S. Application Data

[63] Continuation of Ser. No. 525,369, May 17, 1990, abandoned, which is a continuation of Ser. No. 666,950, Oct. 31, 1984, abandoned.

[51] Int. Cl.$^5$ .............................................. G01V 13/00
[52] U.S. Cl. ..................................... 367/13; 73/1 DV
[58] Field of Search ................... 367/13, 68; 73/1 DV; 340/635

[56] References Cited

U.S. PATENT DOCUMENTS 4,043,175  8/1977  Fredriksson et al. ............. 73/1 DV
4,127,848 11/1978  Shenks ................................. 367/13

Primary Examiner—Ian J. Lobo
Attorney, Agent, or Firm—Edward J. Keeling; Matt W. Carson

[57] ABSTRACT

A LCD display is driven by certain elements to indicate the responses of a geophone to various tests as a waveform. Waveforms are displayed for an impulse tests, wherein a current pulse is applied to the geophone and the response is displayed, and for a tap test, wherein the top of a geophone is tapped and the first break of the resulting displayed waveform indicates the polarity of the geophone connections. Response to a resistance test is provided by a level indicator. The waveform on the display may be examined with reference to a comparitor indicative of a proper response, and the operational or disfunctional condition of the geophone thereby determined.

3 Claims, 13 Drawing Sheets

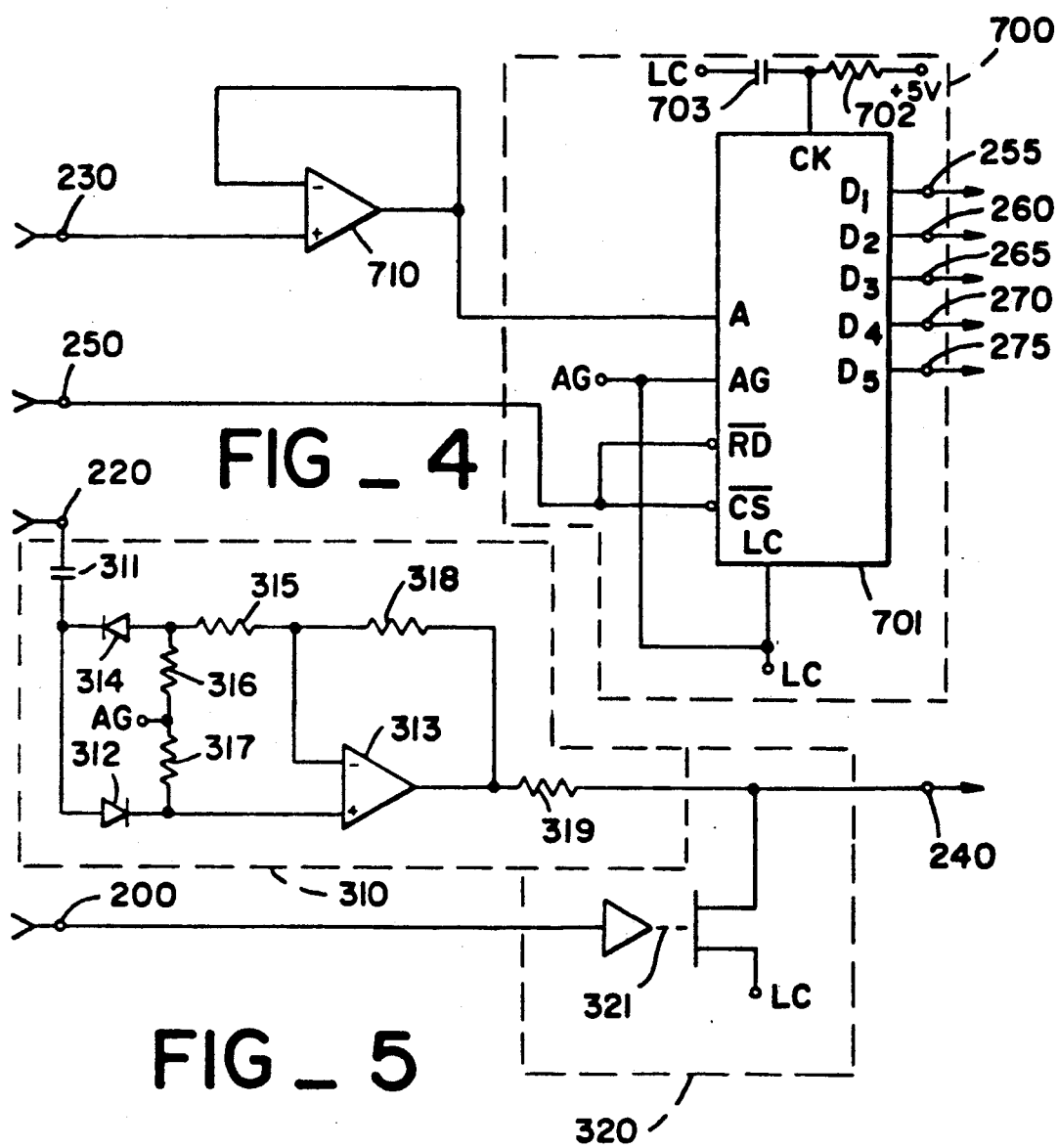
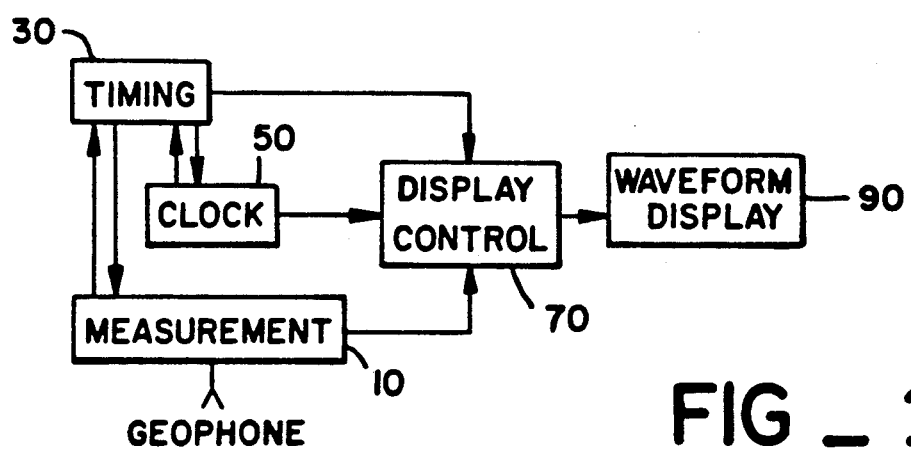

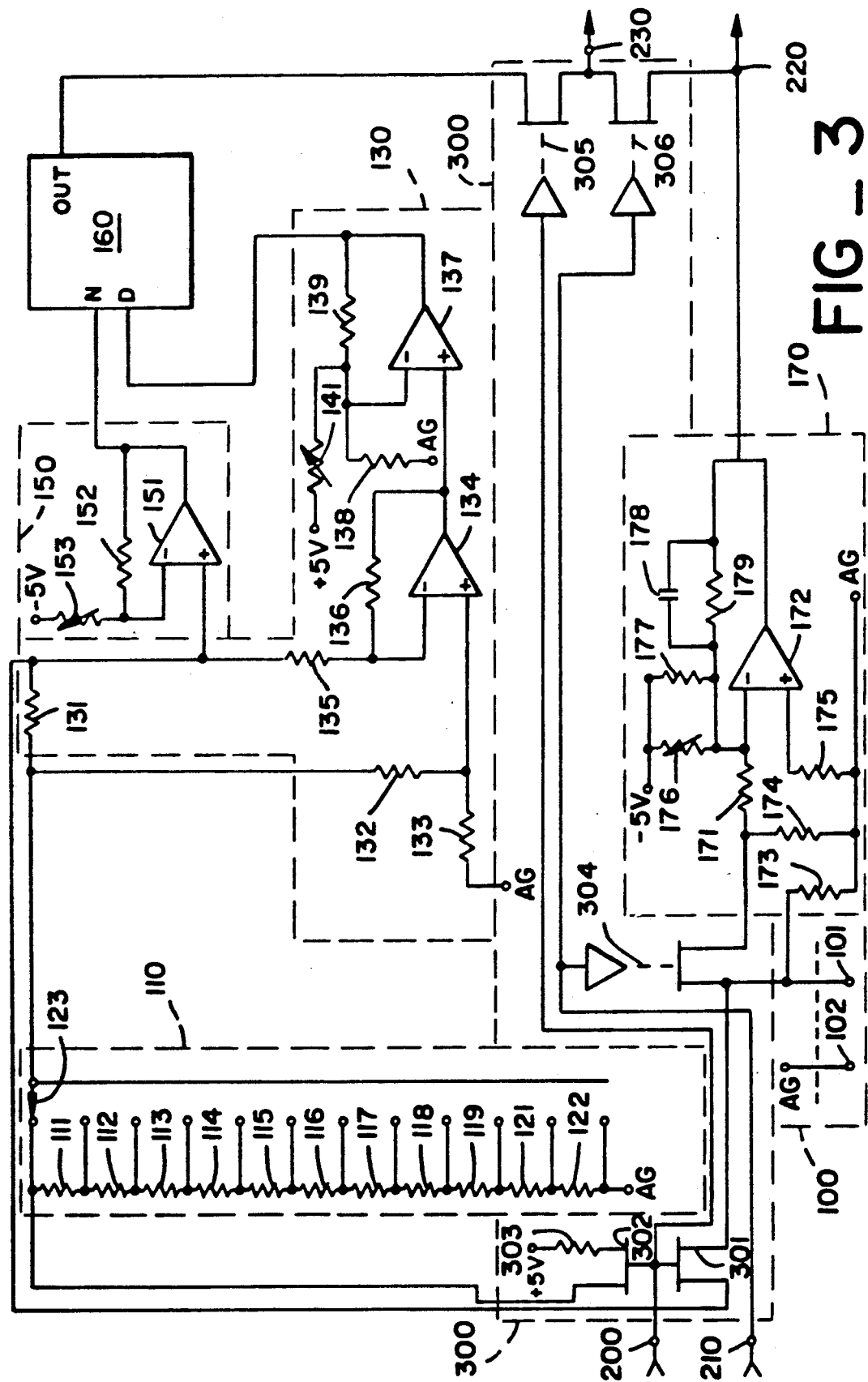

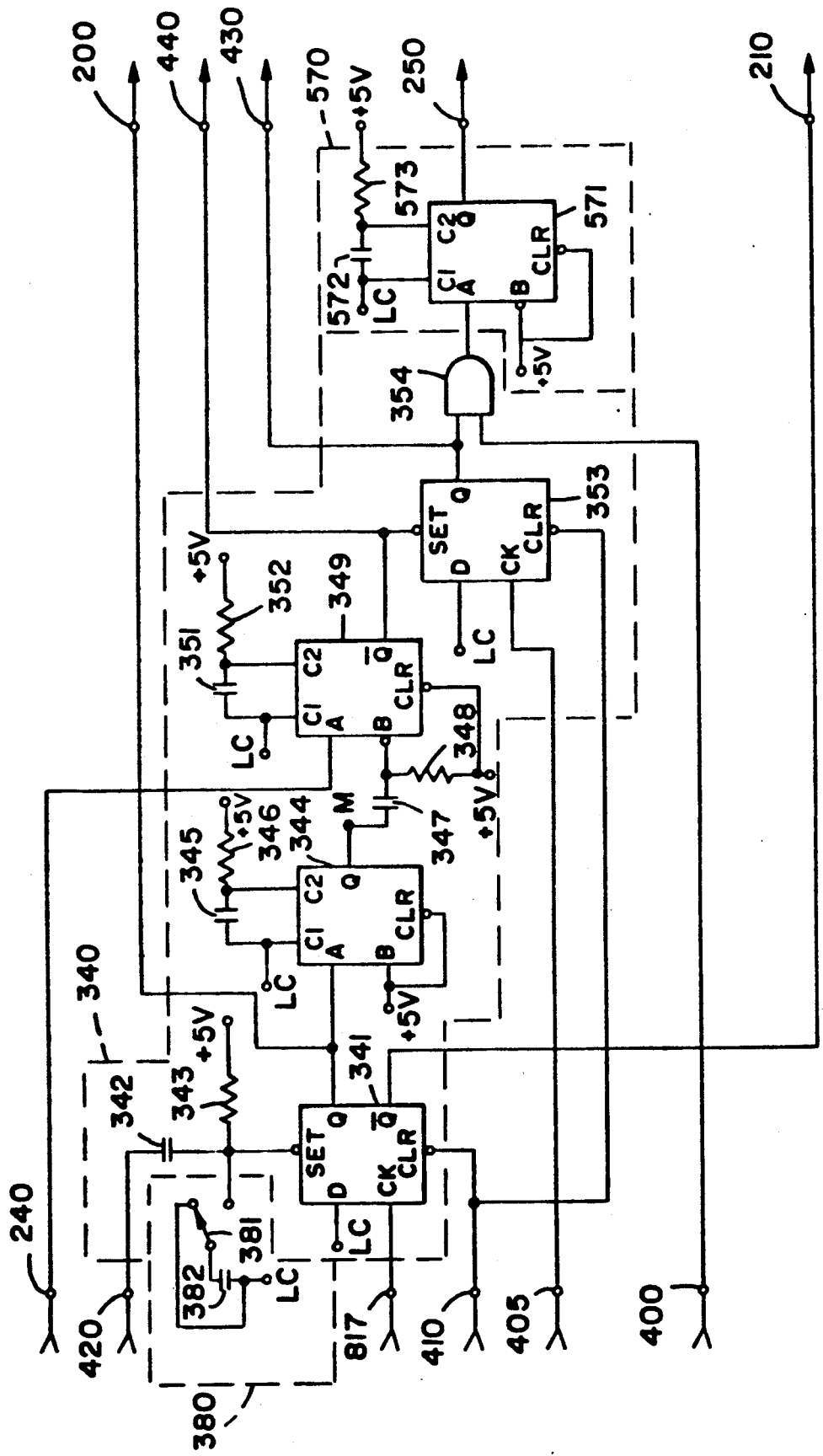
FIG_8

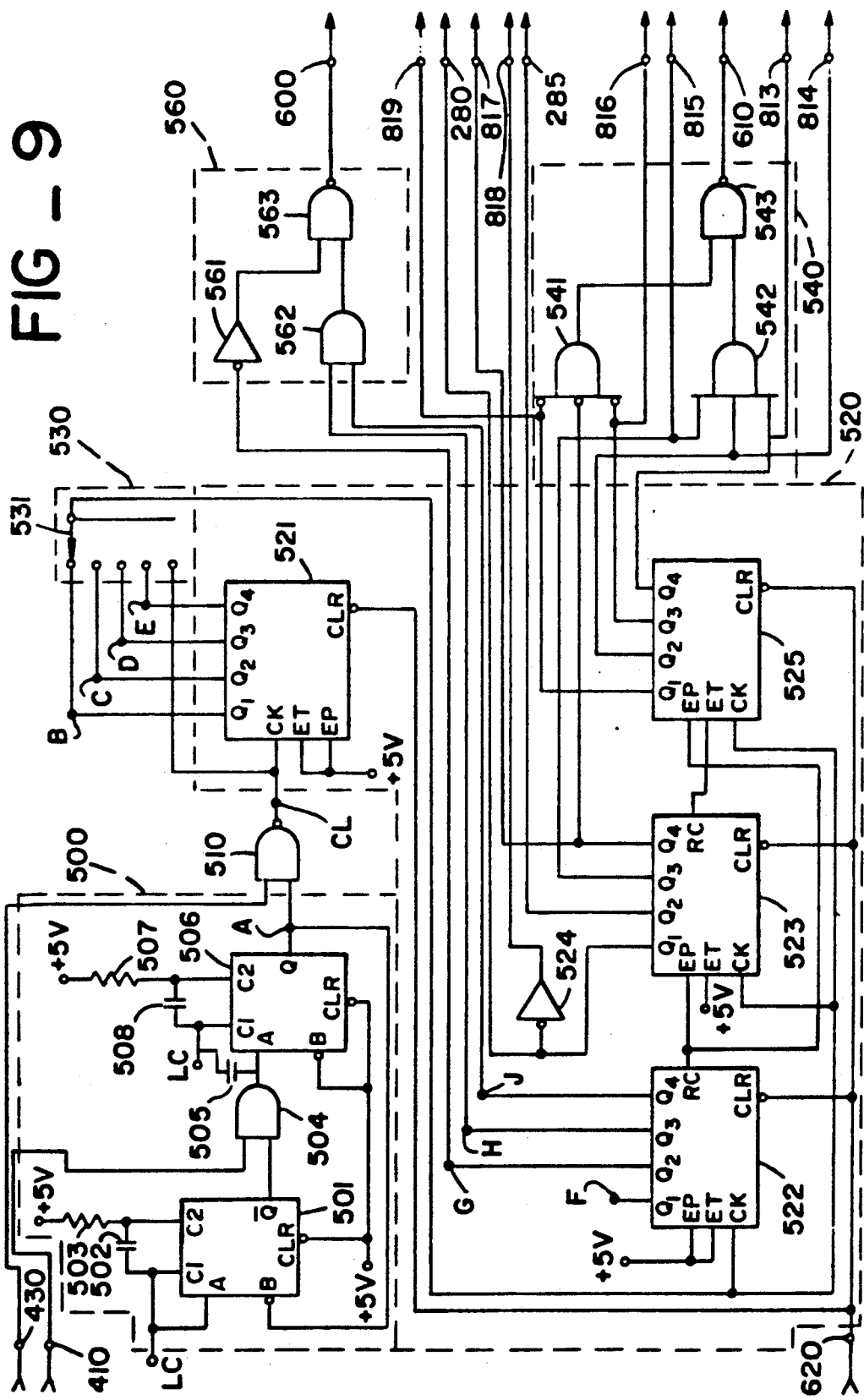

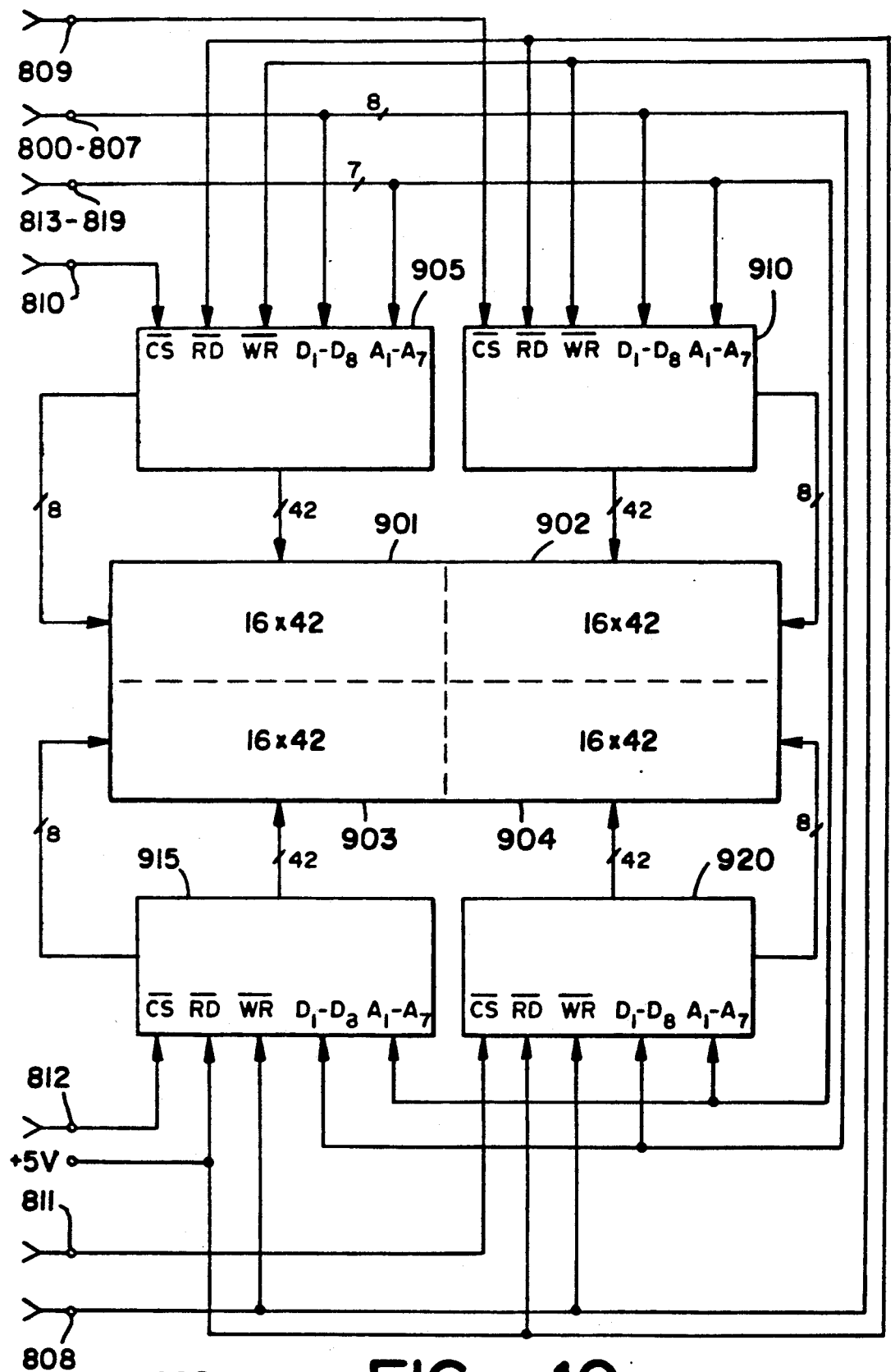
FIG_10

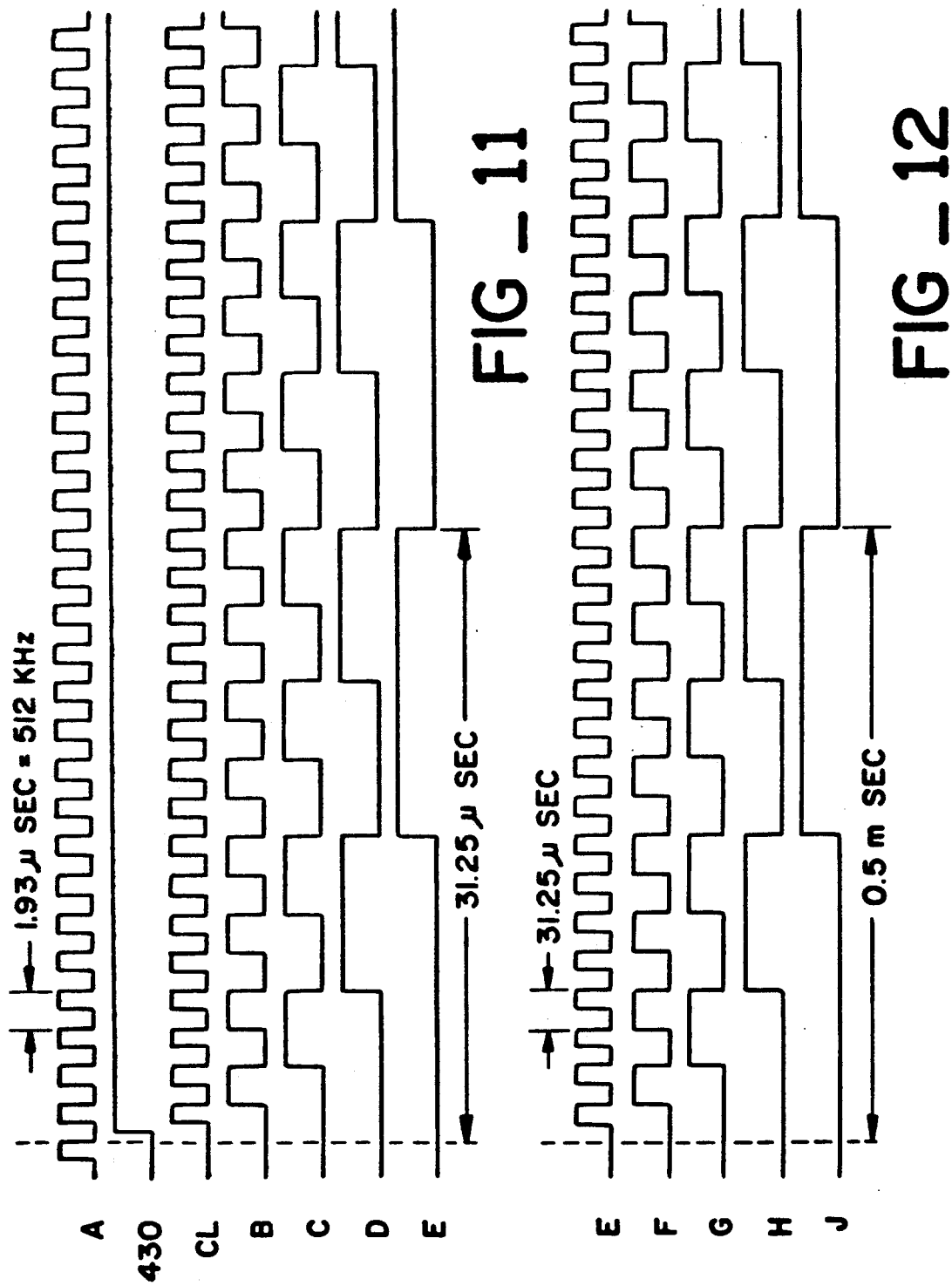

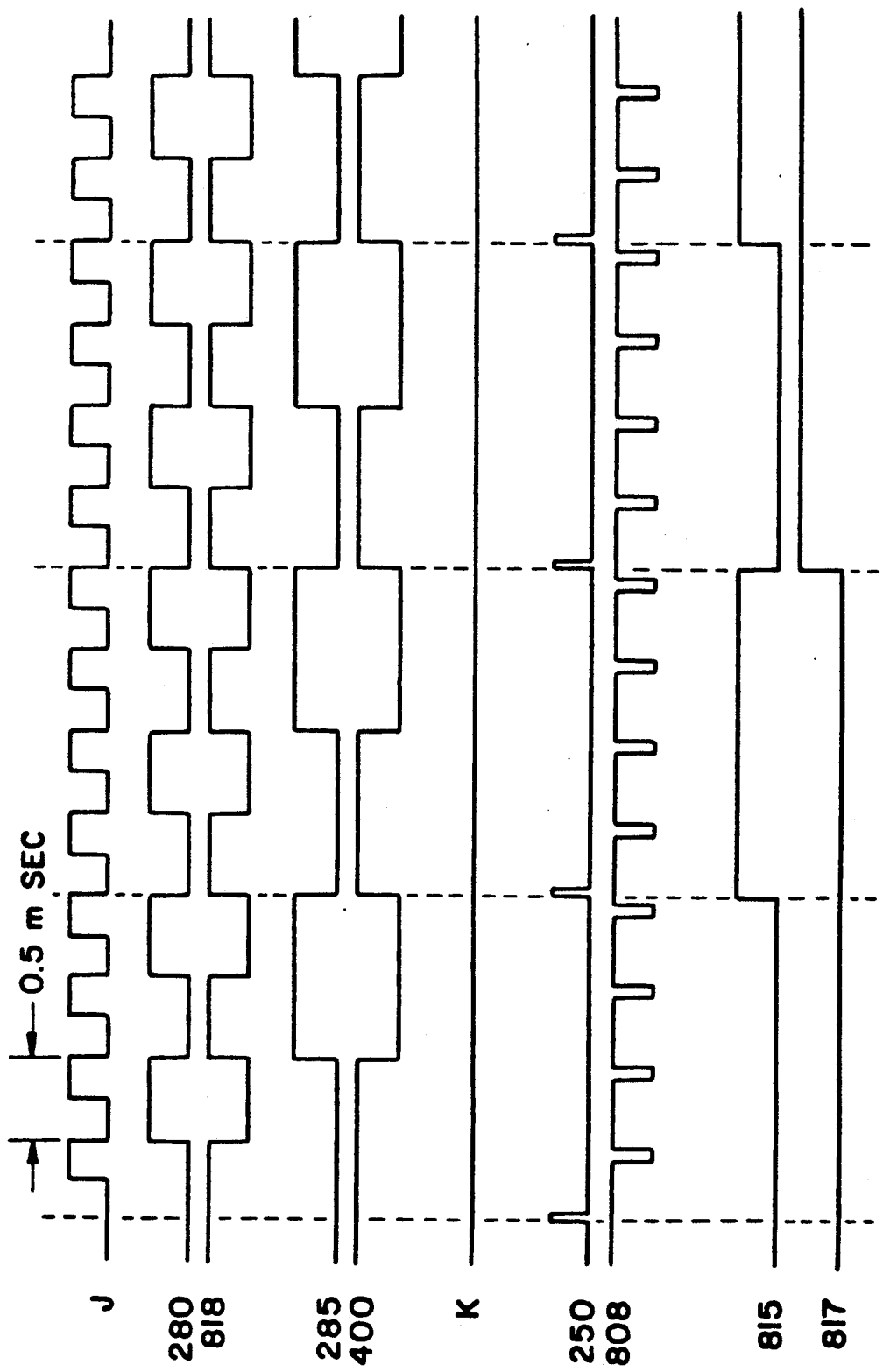
FIG_13

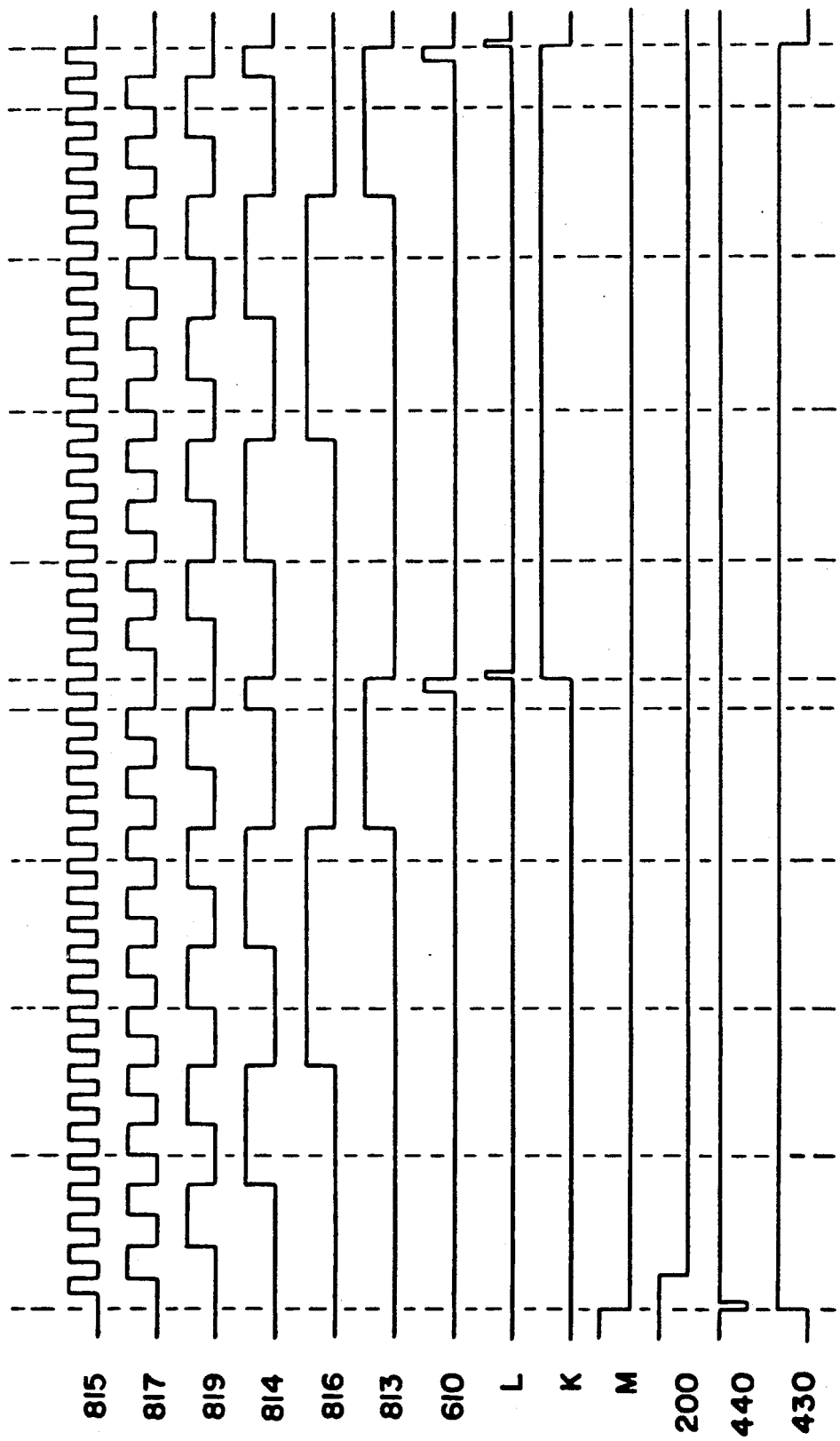
FIG_14

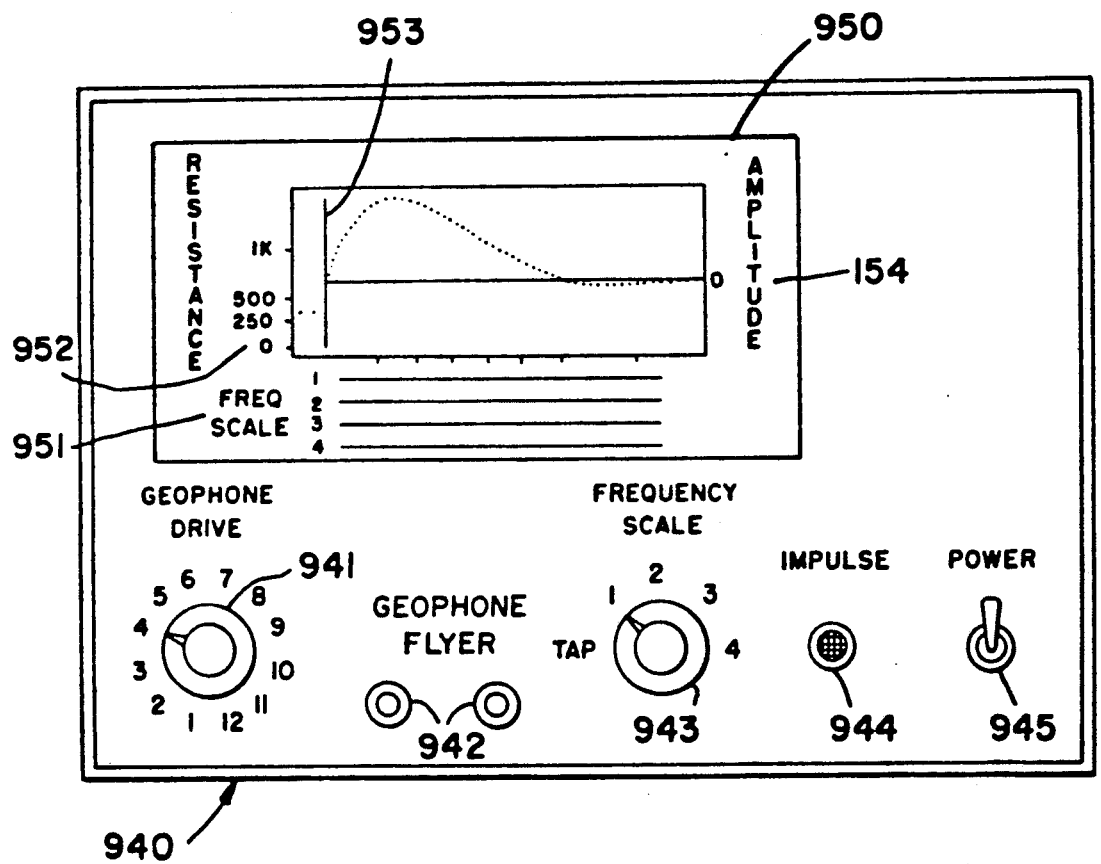
FIG_15

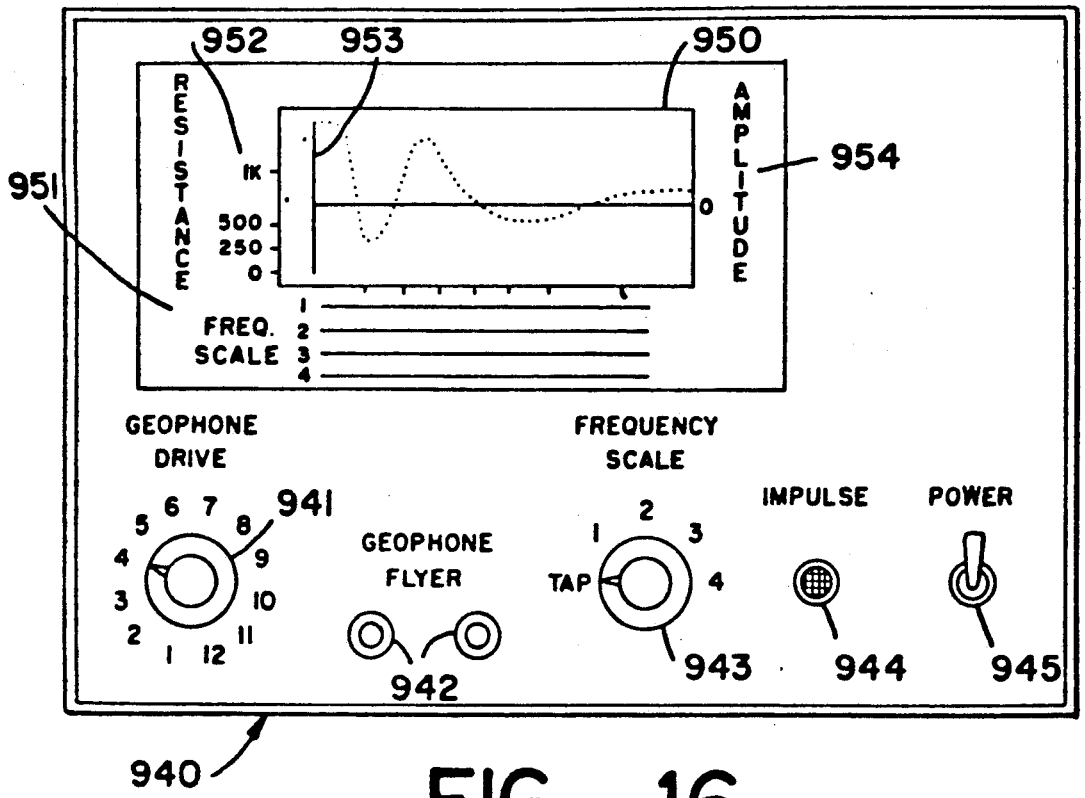
FIG_16
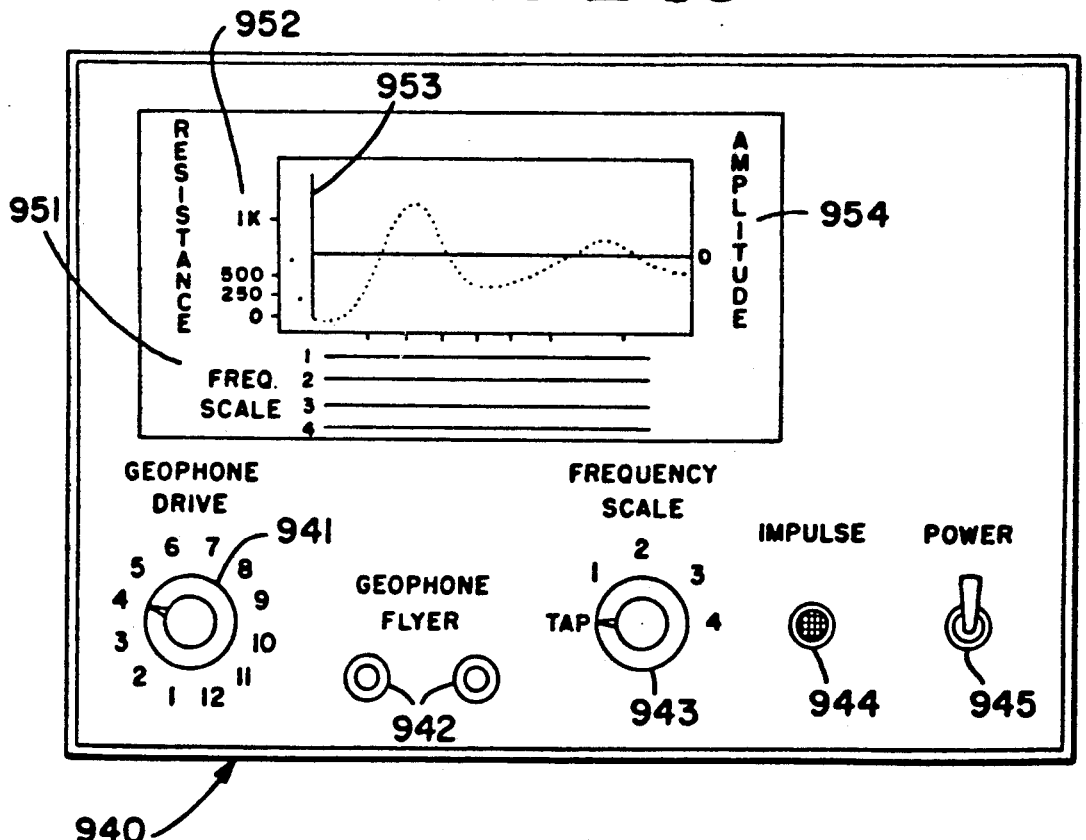
FIG_17

METHOD AND APPARATUS FOR TESTING GEOPHONES

This is a continuation of application Ser. No. 525,369, filed May 17, 1990, now abandoned, which is a continuation of Ser. No. 666,950, filed Oct. 31, 1984 now abandoned.

BACKGROUND OF THE INVENTION

The present invention pertains in general to a method and an apparatus for testing geophones, and in particular, to a method and an apparatus for testing geophones by means of an analog display of geophone responses.

Seismometers are devices for detecting mechanical vibrations. Seismometers which detect vibration by sensing the movement of an inertial mass relative to a fixed supporting structure are commonly called "geophones". While seismometers may be used in a variety of applications, including earthquake detection, intruder detection, and machinery vibration monitoring, geophones are usually employed in the geophysical exploration for oil. Thus, although the term geophone is used herein with reference to the present invention, the present invention may be usefully applied to other types of seismometers as well.

Within a geophone, an electrically conducting coil is commonly suspended about a magnet and its associated coil pieces such that a spring is attached to each end of the coil. The springs position the coil within the magnetic field of the magnet such that their elastic properties determine the resonant frequency of the system. Application of a vibratory stimulus to a geophone causes the coil to move relative to the magnetic field of the magnet so that a voltage is generated across the coil in response. In order to minimize distortion of a voltage response waveform generated by stimulating a geophone with mechanical vibration, the coil must be centered in order to assure that it cuts the lines of force of magnetic flux of a magnet at an even rate.

Seismic data gathering devices for use with geophones normally have a plurality of geophone channels, each channel having two wires which are connected across the coil of the geophone, and a multi-channel signal recording and computing system connected to each of the channels. Often, up to several hundred geophone channels may be used and each channel may be connected to as many as several hundred geophones. The geophones are manually positioned by moving the geophones and attached connecting wires and by planting each geophone in the earth at a selected location.

It is important to maintain a standard polarity when connecting the geophones together in strings. Once the geophone is planted, the ends of the geophone coil are positioned relative to the surface of the earth such that vibration is initially detected as a negative going output across the channel wires connected to the geophone. Geophones which are connected such that the top of the first geophone is connected to the same channel wire as the bottom of another, produce output waveforms which are 180° out of phase so that the output signals from the geophone cancel each other as a result.

It is also important that the impedance of each geophone channel remain substantially constant over time. Handling of the geophones and their connecting wires may result in damage to the geophones or to the wires. Damaged geophones or geophones with damaged connecting wires may produce a no signal or may produce a distorted signal. When a distorted signal from a damaged geophone is mixed in a recording and computing system with signals from other channels, the mixed signal is distorted and is therefore more difficult to correct or to interpret. Thus, it is desirable to test geophones and geophone strings to ascertain whether they have the appropriate impedance and whether they have been damaged by handling.

Despite the existence of a need to determine whether a geophone is capable of operating properly or not, the testing of geophones has not been standardized. In fact, there are several different types of tests which have been developed for geophones, some of which are peculiar to a particular piece of test equipment and others of which may be implemented by more than one type of equipment.

The resonant frequency of a geophone may be investigated by driving the spring and coil assembly with a constant current oscillator and by observing on the screen of an oscilloscope connected to the geophone the Lissajous pattern indicative of the phase difference between the driving current and the back emf induced in the coil of the geophone as described in U.S. Pat. No. 4,259,563. Impedance may be tested by impressing a test current on each channel in order to develop a test voltage across each channel, by generating high and low reference voltages corresponding to a maximum and a minimum acceptable impedance for each channel, and by comparing the test voltage for each channel with the reference voltages for each channel, as described in U.S. Pat. No. 4,298,969. Coil displacement and resonant frequency may be determined by placing a disassembled geophone in the path of a photocell and by respectively detecting photocell interruption with the coil at rest and after the application of a current pulse as in U.S. Pat. No. 4,448,057.

In U.S. Pat. Nos. 4,257,098 and 4,366,561, three types of tests are performed: a leakage test, for measuring the leakage resistance between a geophone string and ground is performed by applying a voltage to an ouput terminal of a geophone station and by noting any reduction in the supplied voltage due to current leakage from the geophone string to ground; a continuity test, measuring the internal resistance of a geophone string, is performed by passing a current through a geophone string and noting the resulting voltage which is proportional to the internal resistance of the string; and a test indicating response parameters of a geophone string is performed by applying a voltage to the string and by examining the output signal from the geophone as it oscillates in response to the applied voltage. The results of the test in U.S. Pat. Nos. 4,257,098 and 4,366,561 are converted into digital form and transmitted to a computer for analysis and generation of a display notifying an operator that geophone strings are operational or malfunctioning.

As in U.S. Pat. Nos. 4,003,018, 4,015,202, 4,043,175, and 4,052,694, geophones may be stimulated with an impulse current or driven with a periodic sinusoidal current. Resulting voltages, indicative of geophone coil amplitudes, are displayed on a meter with a pointer or on a numerical display, and a GO-NO GO indication is derived on the basis of known specifications of the geophones and cables.

Lastly, a geophone or geophone string may be connected to a seismic recording system, a current pulse supplied, and the responses signal from the geophone or string may be twice differentiated to provide an indication of velocity impulse response or may be utilized in other ways common to deconvolving recorded seismic data as described in U.S. Pat. No. 4,392,213.

Unfortunately, seismic crews have little time to spend in testing geophones. For example, miles of conventional in-line, common depth point (CDP), stackable data are generated per day per crew. Furthermore, a seismic exploration spread may extend for miles and may include thousands of geophones placed over rough terrain so that it is often difficult to provide access for a computer or heavy or bulky equipment to a geophone to be tested. In addition, a large number of geophone types are available so that advance knowledge of the types to be used in a particular occasion, specifications for those types and equipment which may be adjusted to properly evaluate the specifications must be available to an operator in order to properly test the geophones.

In response to practical necessity, existing equipment has been miniaturized to the point that cumbersome but marginally portable devices are available for transportation to sites in order to test geophones. The problem of dealing with a wide variety of geophone types has been approached by providing equipment with modules specific to each type. Of course, the problem still remains that in order to test a geophone, the appropriate module must be available on site.

It is also somewhat of a disadvantage that the existing test equipment provide numerical, pointer or an oscilloscope displays which are only indirectly indicative of the response of a geophone to a stimulus. Insofar as an indirect indicator may not warn of a fault, it is not specifically designed to defect. It would be desirable to have a display which portrays the response of a geophone over every point of a test period in a portable, easily interpretable waveform display.

SUMMARY OF THE INVENTION

Accordingly, an apparatus for testing geophones according to the present invention, includes means for measuring the response of a geophone to an applied stimulus which is coupled to means for controlling the display of a waveform representation of geophone response data. Means for timing the measurement and display of geophone response data are coupled to the means for measuring and to the means for controlling. Means for storing geophone response data for the extended or delayed display thereof, are coupled to the means for measuring and to a waveform display.

A method according to the present invention for testing a geophone involves connecting a geophone to a geophone test or having a waveform display capable of storing and of extended display of geophone response data. The selected stimulus is applied to the geophone and a waveform representation of the response of the geophone to the selected stimulus is displayed. The waveform representation of the response of the geophone is compared to a representation of an acceptable response waveform.

BRIEF DESCRIPTION OF THE DRAWINGS

FIG. 1 is a simplified block diagram of an apparatus according to the present invention;

FIG. 3 is a schematic of a geophone drive switch, of a timing control, of a geophone input, of a geophone signal preamplifier, of a voltage sense amplifier, of a current sense amplifier and of an analog divider according to the apparatus of FIG. 2;

FIG. 4 is a schematic diagram of a buffer amplifier and of a A/D converter according to the apparatus of FIG. 2;

FIG. 5 is a schematic diagram of a tap trigger control and a tap trigger switch according to the embodiment of FIG. 2;

FIG. 8 is a schematic diagram of an impulse switch, a cycle control and an A/D read control according to the embodiment of FIG. 2;

FIG. 9 is a schematic diagram of an oscillator, a clock gate, a master counter, a frequency scale switch, a reset logic and a write logic according to the embodiment of FIG. 2;

FIG. 10 is a schematic diagram of an LCD display according to the embodiment of FIG. 2;

FIG. 11 is a first timing diagram of signals present at points in the embodiment of FIG. 2 during its operation;

FIG. 12 is a second timing diagram of signals present in the embodiment of FIG. 2 during its operation on a narrower scale than FIG. 11;

FIG. 13 is a third timing diagram of signals present at various points in the embodiment of FIG. 2 during its operation on a narrower scale than FIG. 12;

FIG. 14 is a fourth timing diagram of signals present at various points in the embodiment of FIG. 2 during its operation;

FIG. 15 is a view in the front plan illustrating a front panel of a device according to the embodiment of FIG. 2 during tests of the resistance and impulse response of a geophone;

FIG. 16 is a view in the front plan of a front panel of a device according to the embodiment of FIG. 2 illustrating a positive result from a tap test; and FIG. 17 is a view in the front plan of a front panel of a device according to the embodiment of FIG. 2 illustrating a negative result of a tap test of a geophone.

DESCRIPTION OF THE PREFERRED EMBODIMENT

Figure 2:
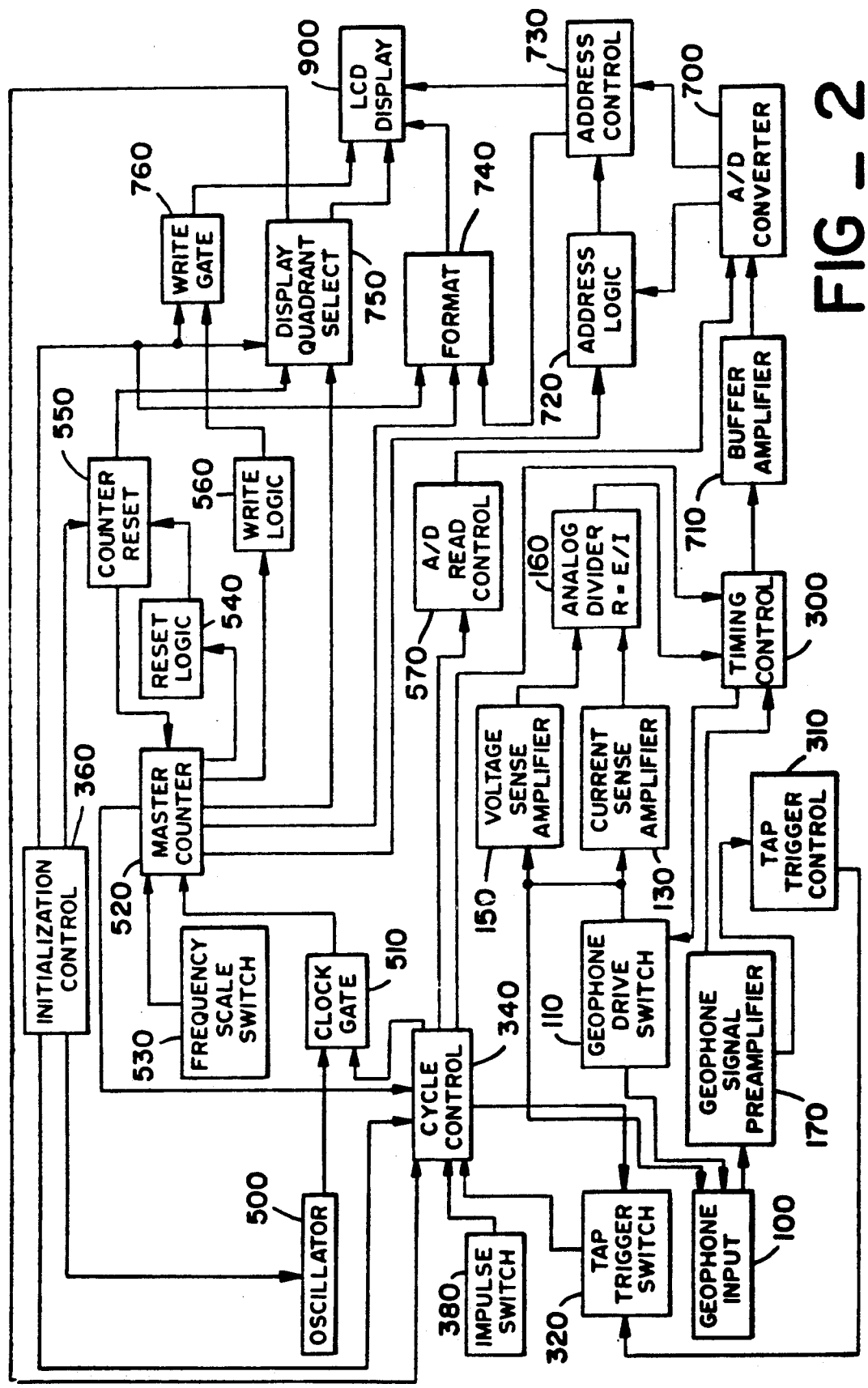
FIG. 2 is a detailed block diagram of the apparatus of FIG. 1.

As illustrated in FIG. 1, in a preferred embodiment of the present invention, a geophone may be tested by connecting a measurement device 10 which provides output to a display control 70. The timing device 30 is connected to a clock 50 and to measurement device 10 and display control 70. After enablement by timing device 30, clock 50 is used by timing device 32 synchronized measurement device 10 and display control 70. Display control 70 is connected to a waveform display 90 which displays the results of the measurement performed by device 10.

The structure and operation of the present invention is more specifically set forth than the detailed block diagram of FIG. 2. In FIG. 2, elements which may be grouped within the general blocks of FIG. 1 are identified by the same initial reference numeral. Thus, a measurement device according to the embodiment of FIG. 2 includes elements 100, 110, 130, 150, 160 and 170. Likewise, a timing device according to the embodiment of FIG. 2 includes elements 300, 310, 320, 340, 360 and 380 as illustrated in FIG. 2. The clock in FIG. 2 includes elements 500, 510, 520, 530, 540, 550, 560 and 570 while a display control according to the embodiment of FIG. 2 includes elements 700, 710, 720, 730, 740, 750 and 760. Similarly, a waveform display according to the embodiment of FIG. 2 includes element 900.

As shown in FIG. 2, a geophone input 100 and a geophone drive switch 110 are connected and each provides input to a geophone, a voltage sense amplifier 150 and a current sense amplifier 130. Input 100 is also connected to and provides an input to a geophone signal preamplifier 170. Each of voltage amplifier 150 and current amplifier 130 provides input connections to an analog divider 160. Analog divider 160 provides an input to a timing control 300.

Timing control 300 provides inputs to switch 110 and to a buffer amplifier 710 while receiving an input from preamplifier 170. Preamplifier 170 also provides an input to a tap trigger control 310 which in turn provides an input to a tap trigger switch 320. A cycle control 340 provides an input to and is provided an input by tap trigger switch 320. An impulse switch 380 likewise provides an input to cycle control 340 as does an initialization control 360 and a master counter 520. Cycle control 340 provides inputs to a clock gate 510, to an A/D read control 570 and to timing control 300.

Initialization control 360 provides an input to an oscillator 500 which in turn provides an input to gate 510. Initialization control 360 also provides inputs to a counter reset 550 and to a display quadrant select 750.

Master counter 520 receives inputs from clock gate 510, from a frequency scale switch 530, and from counter reset 550. Master counter 520 provides outputs to an address logic 720, to format device 740, to display quadrant select 750, to a write logic 560 and to a reset logic 540. A write gate 760 receives inputs from write logic 560 and from initialization control 360.

An A/D converter 700 receives inputs from A/D read control 570 and from buffer amplifier 710. Converter 700 provides inputs to address logic 720 and to an address control 730. Logic 720 provides an input to control 730. Format device 740 receives an input from address control 730 and from initialization control 360. Display quadrant select 750 receives an input from counter reset 550 and from initialization control 360.

LCD display 900 receives inputs from address control 730, format device 740, display quadrant select 750 and right gate 760.

The apparatus of FIG. 2 performs three tests on a geophone. A resistance test measures the internal resistance of the geophone. An impulse response test displays the response of the geophone to a current impulse. Lastly, geophone polarity is tested by displaying the response of a geophone to a mechanical impulse supplied to the top or bottom of the geophone.

In a test of the resistance of the geophone, the geophone is connected to geophone input 100. By doing so, the geophone is connected to a voltage source, the geophone drive switch 110. Current sense amplifier 130 and voltage sense amplifier 150 respective by detect-resulting voltages which represent the voltage and current of the geophone element at the time the voltage is applied. The voltages' level of the outputs of elements 130 and 150 are applied to analog divider 160 which in turn provides a voltage output representing the left-hand side of the equation:

$$R = E/I.$$

The analog voltage output of divider 160 is applied to timing control 300. When timing control 300 is triggered by cycle control 340, in response to the pressing of impulse switch 380, the output voltage of divider 160 is applied through timing control 300 and buffer amplifier 710 to A/D converter 700 wherein it is converted to a digital value. The digital output of converter 700 is applied to address control 730 and it is displayed on LCD display 900.

A resistance test and an impulse response test are initiated by closing impulse switch 380. As a result, a voltage, the magnitude of which is adjustable by geophone drive switch 110, is applied across the geophone under test in order to supply a current for approximately 0.5 seconds. Application of this current causes a physical displacement of the geophone coil. When the current is removed, the coil returns to its natural position, causing a reaction current proportional to the motion of the coil. A waveform produced by the falling coil voltage represents the impluse response of the geophone.

Cycle control 340 is synchronized by master counter 520 in response to the output of oscillator 500 as applied through clock gate 510, so that the resulting voltage of the impulse response test is displayed along with the result of the resistance test. Specifically, cycle control 340 initiates the reading of the resistance test voltage by A/D converter 700 as mediated by A/D read control 570 prior to measurement of the impulse response of the geophone. Cycle control 340 then causes measurement of the response of the falling geophone coil. The reaction current is then applied to the inputs of preamplifier 170 and amplifiers 130, the output of which is applied to timing control 300. At the output of timing control 300 a resulting impulse response voltage is applied through buffer amplifier 710 to A/D converter 700. The voltage resulting from the impulse response test is thus displayed on display 900 through address control 730 is a sequence in which it follows the display of the voltage from the resistance test.

Prior to testing a geophone, connection of the apparatus of FIG. 2 to a power source (not shown) by a power switch (not shown) activates initialization control 360. Control 360 starts oscillator 500. Control 360 initializes cycle control 340 and also initializes master counter 520 by way of counter reset 550. In addition, control 360 clears display 900 by enabling write gate 760 and by providing input to display quadrant select 750 and format device 740. Elements 740, 750 and 760 cause element 900 to display the output of address control 730 at the turning on of the apparatus of FIG. 2. Because address control 730 provides no data to element 900 for display until a test is begun, and because of initialization signals from control 360, a blank display is produced.

A tap test of geophone polarity is initiated by tapping the top of the geophone. By convention, if the connections made to the geophone are of the correct polarity, a waveform generated by tapping the top of the geophone should have a first break that is negative going by convention.

Tapping the top of the geophone causes movement of the coil within the geophone and thereby produces a response voltage. Appearance of a response voltage across geophone input 100 when switch 380 is open, causes activation of tap trigger control 310 through preamplifier 170. Because impulse switch 380 has not been closed, the output of preamplifier 170 passes through timing control 300 to buffer amplifier 710 and A/D converter 700. Tap trigger control 310 is permitted by the state of tap trigger switch 320 to cause cycle control 340 to activate read control 570 so that A/D converter 700 passes the digital data produced at its inputs as a result of the tap trigger voltage onto address control 730 and display 900. Cycle control 340 also enables clock gate 510 so that counter 520 provides the necessary sequencing of information from converter 700 through control of write logic 560, write gate 760, display quadrant select 750, format 740 and address logic 720.

In FIG. 3, geophone drive switch 110, timing control 300, geophone input 100, geophone signal preamplifier 170, voltage sense amplifier 150, current sense amplifier 130 and analog divider 160 are schematically illustrated for the preferred embodiment of FIG. 2.

Within input 100, a first terminal 101 is connected to a first lead of a resistor 173, to a first electrode of a quad switch 304 and to a first electrode of a FET 301. Also within input 100 a second terminal 102 is connected to a node at analog ground.

Within timing control 300, a second electrode of quad switch 304 is connected to a first lead of a resistor 171 and to a first lead of a resistor 174 of geophone signal preamplifier 170. An input of an amplifier within quad switch 304 is connected to a node 210 and to an input of amplifier within a quad switch 306. A first electrode of quad switch 306 is connected to a node 220 while a second electrode of quad switch 306 is connected to a node 230 and to a first electrode of a quad switch 305. An amplifier input of quad switch 305 is connected to a gate electrode of FET 301, to a gate electrode of a FET 302 and to a node 200. A second electrode of quad switch 305 is connected to an output of analog divider 160. A first electrode of FET 302 is connected across a resistor 303 to a node at a potential of +5 volts. A second electrode of FET 302 is connected to a first lead of a resistor 111 in geophone drive switch 110. A second electrode of FET 301 is connected to a first lead of a resistor 131 and to a first lead of a resistor 135 within current sense amplifier 130.

Within geophone drive switch 110, a second lead of resistor 111 is connected to a first lead of resistor 112 and to a terminal. Similarly, a second lead of resistor 112 is connected to a first lead of a resistor 113 and to a terminal. A second lead of resistor 113 is connected to a terminal and to a first lead of resistor 114. A second lead of resistor 114 is connected to a first lead of resistor 115 and to a terminal. A second lead of resistor 115 is connected to a first lead of resistor 116 and to a terminal. A second lead of resistor 116 is connected to a first lead of a resistor 117 and to a terminal. A second lead of resistor 117 is connected to a terminal and to a first lead of a resistor 118. A second lead of resistor 118 is connected to a terminal and to a first lead of a resistor 119, a second lead of resistor 119 is connected to a terminal and to a first lead of a resistor 121 and a second lead of resistor 121 is connected to a terminal and to a first lead of a resistor 122. A second lead of a resistor 122 is connected to a terminal and to an analog ground. A movable contact 123 is pivoted so as to be able to connect any of the terminals within switch 110 to a second lead of resistor 131 and to a first lead of a resistor 132, both within current sense amplifier 130.

A second lead of resistor 132 is connected to a first lead of a resistor 133, a second lead of which is connected to an analog ground. Also within amplifier 130, a non-inverting input of an operational amplifier 134 is connected to the second lead of resistor 132 while an inverting input of amplifier 134 is connected to a first lead of a resistor 136 and to a second lead of resistor 135. A second lead of resistor 136 is connected to an output of amplifier 134 and to a non-inverting input of an operational amplifier 137. An inverting input of amplifier 137 is connected across a resistor 138 to an analog ground, is connected across a variable resistor 141 to a node at a potential of +5 volts and is connected to a first lead of a resistor 139. An output of amplifier 137 is connected to a second lead of resistor 139 and to a denominator input of divider 160.

Within voltage sense amplifier 150, a non-inverting input of an operational amplifier 151 is connected to the first lead of resistor 131 and to the first lead of resistor 135. An inverting input of amplifier 151 is connected to a first lead of a variable resistor 153 and to a first lead of a resistor 152. A second lead of resistor 153 is connected to a node at a potential of −5 volts. A second lead of resistor 152 is connected to an ouput of amplifier 151 and to a numerator input of divider 160.

In geophone signal preamplifier 170, a second lead of resistor 173 is connected to a second lead of resistor 174 and to a first lead of a resistor 175. A second lead of resistor 175 is connected to a non-inverting input of an operational amplifier 172, and inverting input of which is connected to a second lead of resistor 171, to a first lead of a variable resistor 176, to a first lead of a resistor 177, to a first lead of a capacitor 178 and to a first lead of a resistor 179. A second lead of resistor 176 and a second lead of resistor 177 are connected to a node at a potential of −5 volts. A second lead of capacitor 178 and a second lead of resistor 179 are connected to an output of amplifier 172 and to node 220.

Turning now to FIG. 4, in buffer amplifier 710, a non-inverting input of an operational amplifier is connected to a node 230. An output of operational amplifier 710 is connected to an inverting input of operational amplifier 710 and to an analog input of an A/D converter 701 within element 700.

Within element 700, an analog ground input of A/D converter 701 is connected to a node at analog ground and to a node at a logic common. A logic common input of A/D converter 701 is also connected to the node at logic common and to the node at analog ground. In this way, analog and digital components are isolated, except at this point, in order to prevent interference.

An inverted read input $\overline{RD}$ and an inverted cycle select input $\overline{CS}$, both of A/D converter 701, are connected to a node 250. A clock input of A/D converter 701 is connected to a node at logic common across a capacitor 703 and to a node at +5 volts across a resistor 702. A/D converter 701 has a first digital output $D_1$ which is connected to a node 255, a second digital output $D_2$ which is connected to a node 260, a third digital output $D_3$ which is connected to a node 265, a fourth digital output $D_4$ which is connected to a node 270 and a fifth digital output $D_5$ which is connected to a node 275.

Referring now to FIG. 5, within tap trigger control 310, a first lead of a capacitor 311 is connected to node 220 while a second lead of capacitor 311 is connected to a cathode of a diode 314 and to an anode of a diode 312. An anode of diode 314 is connected to a first lead of a capacitor 316 and to a first lead of a capacitor 315. A second lead of capacitor 316 and a first lead of a capacitor 317 are connected to analog ground. A second lead of capacitor 317 is connected to a cathode of diode 312 and to a non-inverting input of an operational amplifier 313. An inverting input of amplifier 313 is connected to a second lead of resistor 315 and to a first lead of a resistor 318. A second lead of resistor 318 is connected to an output of amplifier 313 and to a first lead of a resistor 319. A second lead of resistor 319 is connected to a node 240.

Also in FIG. 5, tap trigger switch 320 comprises a quad switch 321 having an amplifier input connected to node 200, having a first electrode connected to a node at logic common and having a second electrode connected to node 240.

Figure 6:
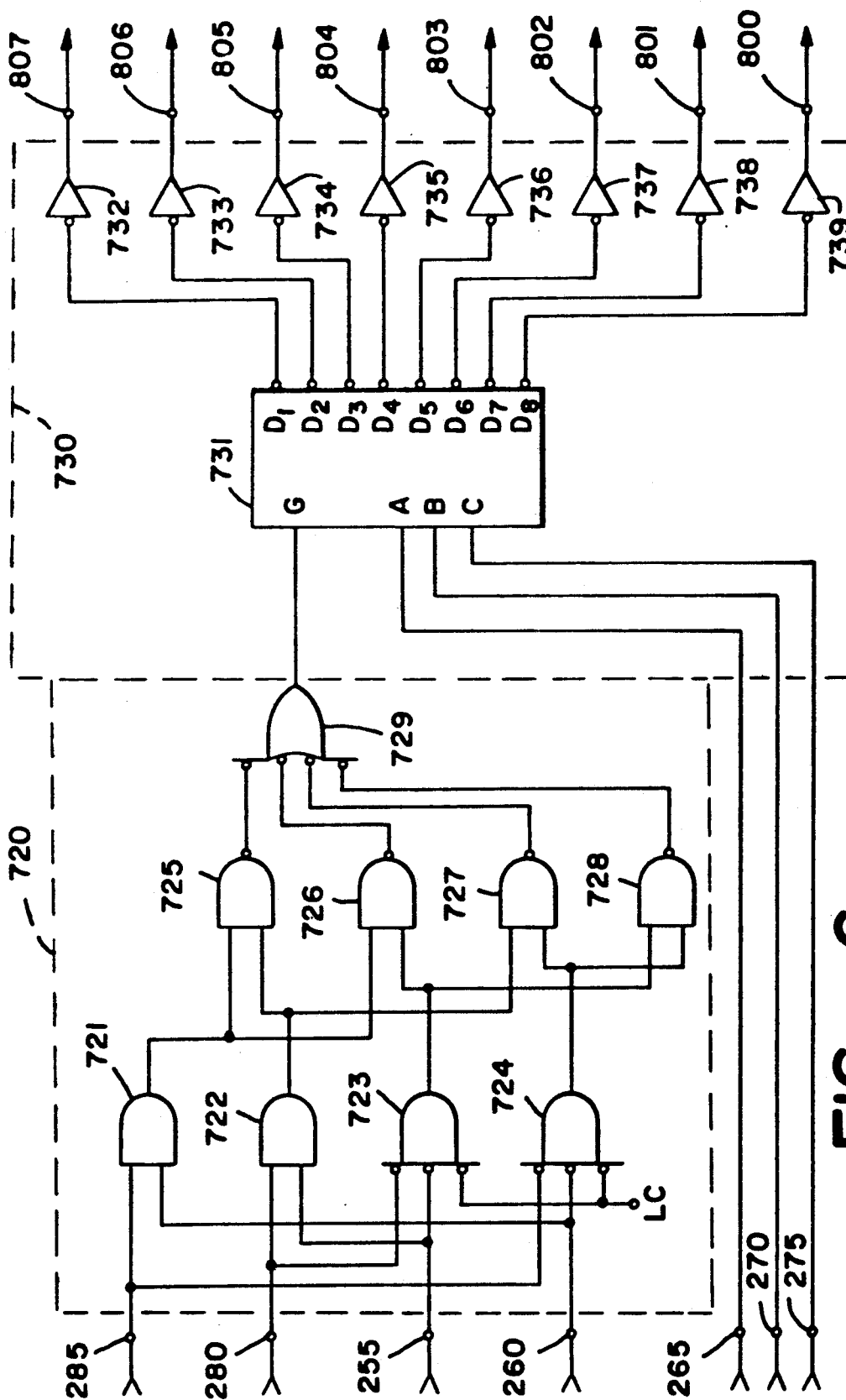
FIG. 6 is a schematic diagram of an address logic and an address control according to the embodiment of FIG. 2.

As illustrated in FIG. 6, address logic 720 contains a AND gate 721 having a first input connected to a node 285 and to low-active input of an AND gate 724. A second input of AND gate 721 is connected a second low-active input of AND gate 724 and to a node 260. A third low-active input of AND gate 724 is connected to logic common and to a first low-active input of an AND gate 723. A second inverted input of AND gate 723 is connected to a first input of an AND gate 722. A second input of AND gate 722 is connected to a node 280 and to a third low-active input of AND gate 723. An output of AND gate 721 is connected to a first input of an AND gate 725 and to a first input of an AND gate 726. An output of AND gate 722 is connected to a second input of AND gate 725 and to a first input of an AND gate 727. An output of AND gate 723 is connected to a second input of AND gate 726 and to a first input of an AND gate 728. An output of AND gate 724 is connected to a second input of AND gate 727 and to a second input of NAND gate 728. The low-active output of each of AND gates 725, 726, 727 and 728 are respectively connected to a first low-active input, a second low-active input, a third low-active input and a fourth low-active input of an OR gate 729.

Also in FIG. 6, the address control 730 contains a binary to decimal converter 731 having an enabling input G connected to an output of OR gate 729 in address logic 720. Converter 731 has a first input A connected to node 265, a second input B connected to node 270 and a third input C connectd to node 275. Converter 731 has a first low-active digital output $D_1$ connected to a low-active input of an inverter 732. A second low-active digital output $D_2$ is connected to a low-active input of an inverter 733, a third inverted digital output $D_3$ is connected to an inverted input of an inverter 734, a fourth low-active digital output $D_4$ is connected to a low-active input of an inverter 735, a fifth low-active digital output $D_5$ is connected to a low-active input of an inverter 736, a sixth low-active digital output $D_6$ is connected to a low-active input of an inverter 737, a seventh low-active digital output is connected a low-active input of an inverter 738 and an eighth low-active digital output is connected to a low-active input of an inverter 739. An output of inverters 732, 733, 734, 735, 736, 737, 738 and 739 is respectively connected to a node 807, a node 806, a node 805, a node 804, a node 803, a node 802, a node 801 and a node 800.

Figure 7:
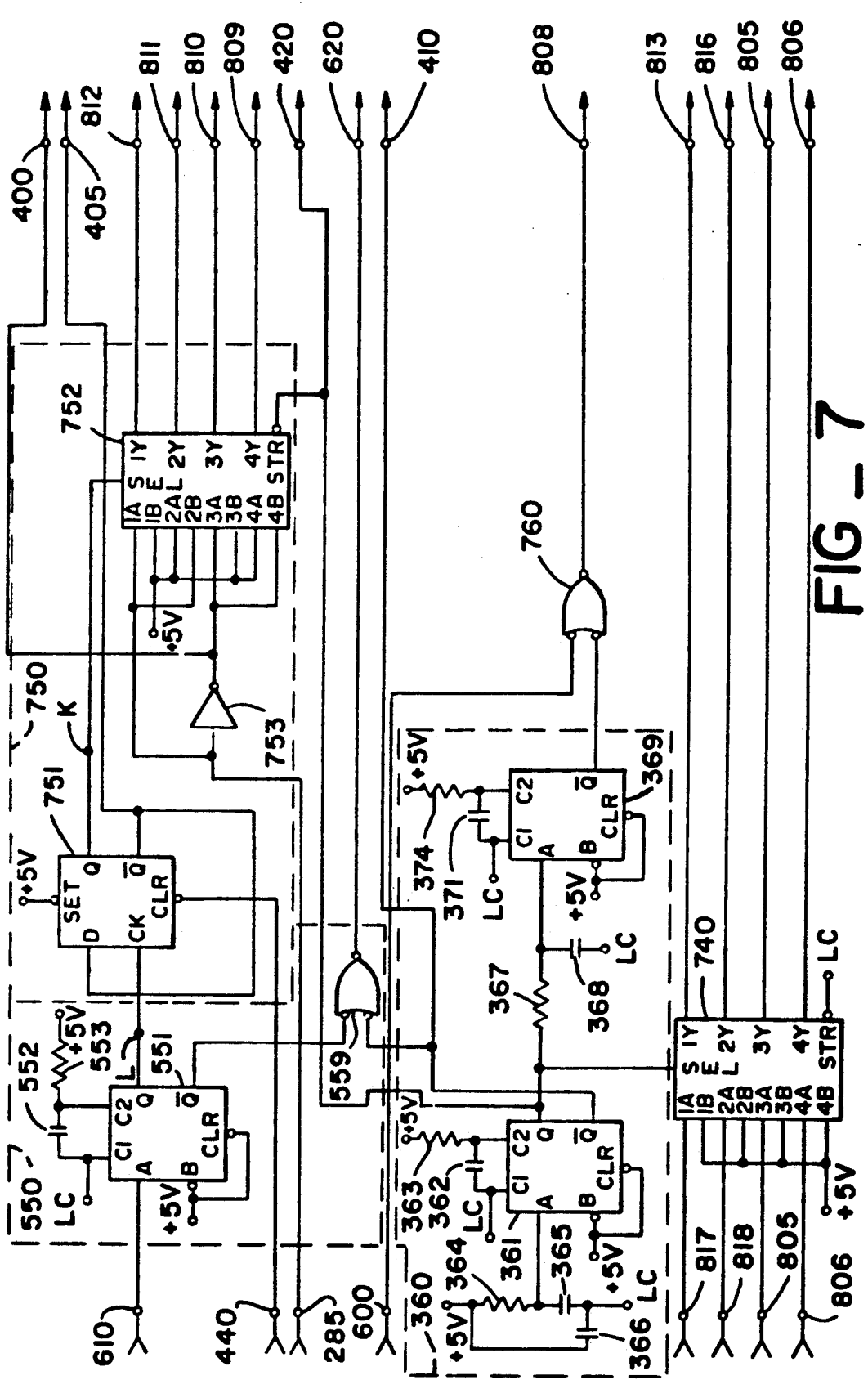
FIG. 7 is a schematic diagram of a formatting device, a cycle control, a write gate, a counter reset, an initialization control and a display quadrant select according to the embodiment of FIG. 2.

In FIG. 7, formatting device 740, cycle control 340, right gate 760, counter reset 550, initialization control 360 and display quadrant select 750 are schematically illustrated.

In formatting device 740, an 8-input to 4-input switch has a first of set four inputs, 1A, 2A, 3A, and 4A, and a second set of four inputs, 1B, 2B, 3B and 4B. These sets of inputs are alternately switchable respectively to a single set of four outputs, 1Y, 2Y, 3Y and 4Y. Formatting device 740 has a select input SEL connected to a Q output of a mono-stable multi-vibrator 361, to a node 420, and to a first lead of a resistor 367 in initialization control 360 as well as to an inverted output of an 8-input to 4-output switch 752 in display quadrant select 750. Formatting device 740 also has an low-active strobe input connected to logic common. In formatting device 740, input 1A is connected to a node 817, input 2A is connected to a node 18, input 3A is connected to a node 805, and input 4A is connected to a node 806. Inputs 1B, 2B, 3B and 4B are connected to a node at a potential of +5 volts. Output 1Y is connected to a node 813, output 2Y is connected to a node 816, output 3Y is connected to a node 805 and output 4Y is connected to a node 806.

In initialization control 360 multi-vibrator 361 has a first input A connected to a first lead of a resistor 364 and to a first lead of a capacitor 365. A second lead of capacitor 365 is connected to a first lead of a capacitor 366 and to logic common. A second lead of capacitor 366 is connected to a second lead of resistor 364 and to a node at a potential of +5 volts. A low-active second input D of multi-vibrator 361 is connected to a low-active clear input CLR and to a node at a potential of +5 volts. A first timing input C1 of multi-vibrator 361 is connected to a first lead of a capacitor 362 and to logic common. A second timing input of multi-vibrator 361 is connected to a second lead of capacitor 362 and to a first lead of a resistor 363, a second lead of which is connected to a node at a potential of +5 volts. A $\overline{Q}$ output of multi-vibrator 361 is connected to a first low-active input of OR gate 559 in counter reset 550 and to a node 410. A second lead of resistor 367 is connected to a first lead of a capacitor 368 and to a first input A of a mono-stable multi-vibrator 369. A second input B and a clear input CLR of multi-vibrator 369 are connected to a node at a potential of +5 volts. A first timing input C1 is connected to a first lead of a capacitor 371 and to logic common. A second timing input C2 is connected to a second lead of capacitor 371 and to a first lead of a resistor 374, a second lead of which is connected to a node at a potential of +5 volts.

Write gate 760 includes an OR gate 760 having a first low-active input connected to a $\overline{Q}$ output of multi-vibrator 369. A second low-active input of of OR gate 760 is connected to a node 600. An inverted output of OR gate 760 is connected to a node 808.

Within counter reset 550, a first input A of a mono-stable multi-vibrator 551 is connected to a node 610. A second input B and a clear input CLR of multi-vibrator 551 are connected to a node at a potential of +5 volts. A first timing input C1 of multi-vibrator 551 is connected to a first lead of a capacitor 552 and to logic common. A second lead of capacitor 552 is connected to a first lead of a resistor 553 and to a second timing input of multi-vibrator 551. A second lead of resistor 553 is connected to a node at a potential of +5 volts. A $\overline{Q}$ output of multi-vibrator 551 is connected to a second low-active input of OR gate 559, a low-active output of which is connected to a node 620.

Display quadrant select 750 includes a D-type flip-flop 751 having a D input connected to a $\overline{Q}$ output and to a node 405. A clock input CK of flip-flop 751 is connected to a Q output of multi-vibrator 551 in counter reset 550 through a node L. A set input SET of flip-flop 751 is tied to a node at a potential of +5 volts while a clear CLR input of flip-flop 751 is connected to a node 440. A Q output of flip-flop 751 is connected to a node K which is turn connected to a select input SEL of an 8-input to 4-output switch 752. A first set of four inputs 1A, 2A, 3A and 4A are respectively connected to: an input of an inverter 753, to a node 285, and to a second input 2B of a second set of inputs of switch 752; a first input 1B of a second set of inputs of switch 752 and a node at a potential of +5 volts; an inverted output of inverter 753, a node 400, and a fourth input 4B of a second set of inputs of switch 752; and a third input 3B of a second set of inputs of switch 752 and a node at a potential of +5 volts. Four outputs, 1Y, 2Y, 3Y and 4Y, of switch 752 are respectively connected to a node 812, a node 811, a node 810, and a node 809.

In FIG. 8, impulse switch 380, cycle control 340, and A/D recontrol 570 are schematically illustrated.

Within impulse switch 380, a single pole switch 381 has a tap at the first end connected to a first lead of a capacitor 382 and to logic common, and has a second end connected to a second lead of capacitor 382. When thrown, the first end of switch 381 is connected to a first lead of a capacitor 342, a first lead of resistor 343, and an inverted set input SET of a type D flip-flop 341 in cycle control 340.

Within cycle control 340, a second lead of capacitor 342 is connected to a node 420. A second lead of resistor 343 is connected to a node at a potential of +5 volts. A D-input of flip-flop 341 is connected to logic common while a clock input CK of flip-flop 341 is connected to a node 817. A low-active clear input CLR is connected to a node 410 and to an inverted clear input CLR of a flip-flop 353. A $\overline{Q}$ output of flip-flop 341 is connected to node 210. A Q output of flip-flop 341 is connected to node 200 and to a first input A of a mono-stable multi-vibrator 344. A second input B at an inverted clear input CLR both of multi-vibrator 344 are connected to a node at a potential of +5 volts. A first timing input C1 of multi-vibrator 344 is connected to logic common and to a first lead of a capacitor 345. A second lead of capacitor 345 is connected to a first lead of a resistor 346 which has a second lead connected to a node at a potential of +5 volts. A second timing input C2 of multi-vibrator 344 is connected to a second lead of capacitor 345. A Q output of multi-vibrator 344 is connected to a node M which is in turn connected to a first lead of a capacitor 347. A second lead of capacitor 347 is connected to a first lead of a resistor 348 and to a low-active second input B of a mono-stable multi-vibrator 349. A first input A of multi-vibrator 349 is connected to node 240. A low-active clear input CLR of multi-vibrator 349 and a second lead of resistor 348 are connected to a node at a potential of +5 volts. A first timing input C1 of multi-vibrator 349 is connected to logic common and to a first lead of a capacitor 351. A second timing input C2 of multi-vibrator 349 is connected to a second lead of capacitor 341 and a first lead of a resistor 352, a second lead of which is connected to a node at a potential of +5 volts. A $\overline{Q}$ output of multivibrator 349 is connected to a low-active set input SET of a type D flip-flop 353 and to a node 440. A D input of flip-flop 353 is connected to logic common. A clock input CK of flip-flop 353 is connected to a node 405 while a Q output of flip-flop 353 is connected to a node 430 and to a first input of an AND gate 354. A second input of AND gate 354 is connected to a node 400.

A/D recontrol 570 contains a mono-stable multi-vibrator 571 having a first input A connected to an output of AND gate 354 in cycle control 340. A low-active second input D and a low-active clear input CLR of multi-vibrator 571 are connected to a node at a potential of +5 volts. A first timing input C1 of multi-vibrator 571 is connected to logic common and to a first lead of a capacitor 572. A second lead of which is connected to a second timing input C2 of multi-vibrator 571 and to a first lead of a resistor 573. A second lead of resistor 573 is connected to a node at a potential of +5 volts. A Q output of multi-vibrator 571 is connected to a node 250.

In FIG. 9, oscillator 500, clock gate 510, frequency scale switch 530, master counter 520, reset logic 540 and right logic 560 are schematically illustrated.

In oscillator 500, a first input A and a first timing input C1 of the mono-stable multi-vibrator 501 are connected to logic common. Input C1 is also connected to a first lead of a capacitor 502. A second lead of capacitor 502 is connected to a first lead of a resistor 503 and to a second timing input C2 of multi-vibrator 501. A second lead of resistor 503 is connected to a node at a potential of +5 volts. A low-active second input D of multi-vibrator 501 is connected to a node A and to a Q output of a mono-stable multi-vibrator 506. A low-active clock input of multi-vibrator 501, an inverted second input B of multi-vibrator 506 and an inverted clock input of multi-vibrator 506 are all connected to a node at a potential of +5 volts.

A first input of an AND gate 504 is connected to a $\overline{Q}$ output of multi-vibrator 501. A second input of an AND gate 504 is connected to node 410. An output of AND gate 504 is connected to a first lead of a capacitor 505 and to a first input A of multi-vibrator 506. A second lead of capacitor 505, a first lead of a capacitor 508 and a first timing input C1 of multi-vibrator 506 are all connected to a node at logic common. The second lead of capacitor 508 and the first lead of a resistor 507 are connected to a second timing input C2 of multi-vibrator 506. A second lead of resistor 507 is connected to a node at a potential of +5 volts.

Clock gate 510 includes an AND gate 510 having a first input connected to node 430 and having a second input connected to node A. A low-active output of AND 510 is connected to a node CL.

Frequency scale switch 530 includes a 5-pole switch having a wiper 531. The 5-pole switch 530 has terminals respectively connected to a node B, a node C, a node D, a node E and node CL.

Within master counter 520, a counter 521 has a clock input CK connected to node CL and has an ET input and an EP input connected to a node at a potential of +5 volts. Counter 521 has a low-active clear input CLR connected to node 620. Counter 521 also has four outputs, $Q_1$, $Q_2$, $Q_3$ and $Q_4$, which are respectively connected to node B, node C, node D and node E.

Also within master counter 520, a clock input of each of 3 counters, 522, 523, and 525 is connected to wiper 531. A low-active clear input CLR of each of counters 522, 523 and 525 is connected node 620. An ET input and an EP input of counter 522 are connected to a node at a potential of +5 volts. Four outputs of counter 522, $Q_1$, $Q_2$, $Q_3$ and $Q_4$, are respectively connected to a F, a node G, a node H, and a node J. A ripple count output RC of counter 522 is connected to a EP input of counter 523 and to an EP counter 525. An ET input of counter 523 is connected to a node at a potential of +5 volts. A first output $Q_1$ of counter 523 is connected to a low-active output of an inventer 524 and to node 280. An output of inverter 524 is connected to a node 818. The second output $Q_2$ of counter 523 is connected to node 285. A third output $Q_3$ of counter 523 is connected to a node 815 and to a first input of an AND gate 542 in reset logic 540. A fourth output $Q_4$ of counter 523 is connected to a node 817 and to a first low-active input of AND gate 541. A ripple counter RC of counter 523 is connected to an ET input of counter 525. A first output of $Q_1$ of counter 525 is connected to a second low-active input of AND gate 541 and to a node 819. A second output $Q_2$ of counter 525 is connected to a second input of AND gate 542 and to a node 814. A third output $Q_3$ of counter 525 is connected to a third low-active input of AND gate 541 and to node 816. A fourth output $Q_4$ of counter 525 is connected to a third input of AND gate 542 and to node 813.

In reset logic 540, an output of AND gate 541 is connected to a first input of NAND gate 543 while an output of AND gate 542 is connected to a second input of AND gate 543. A low-active output of and GATE 543 is connected to node 610.

Within write logic 560, a first input of a AND gate 562 is connected to node H while a second input of AND gate 562 is connected to node J. An output of AND gate 562 is connected to a first input of an AND gate 563, a second input of which is connected to an output of an inverter 561. A low-active input of inverter 561 is connected to node G. A low-active output of AND gate 563 is connected to node 600.

LCD display 900 is shown schematically in FIG. 10. Display 900 consists of four adjacent LCD modules 901, 902, 903 and 904, each of which is designed for bit image display in 16 rows of 542 columns. The modules are respectively driven by four CMOS controller/driver LSI chips. Each LSI is a microprocessing unit MPU which receives control data and data to be displayed. Each MPU sends bit image data to a display data random access memory (RAM) and transfers the bit image data to an internal LCD driver. The display data RAM may read from or write to the MPU. Each LSI drives 16 rows and 42 columns and has a total capacity of 84 bytes of static RAM for memorizing bit image data. Thus, each LSI controls a specific quadrant of display 900. In order to designate bit image information, image data is written into the display data RAM by way of a data bus which is addressed by an address bus.

As illustrated in FIG. 10, a low-active chip select input $\overline{CS}$ of an LSI chip 905 is connected to a node 810. Similarly, a low-active chip select input $\overline{CS}$ of each of LSI chips 910, 915 and 920 are respectively connected to nodes 809, 812, and 811. Each of chips 905, 910, 915 and 920 has low-active read input $\overline{RD}$ connected to a node at a potential of +5 volts and each has a low-active write input $\overline{WR}$ connected to node 808. Each of chips 905, 910, 915 and 920 has 8 data inputs, $D_1-D_8$, connected to an 8-line address bus which is in turn connected to nodes 800, 801, 802, 803, 804, 805, 806 and 807. In addition, each of chips 905, 910 and 915 and 920 has seven address inputs, $A_1-A_7$, connected to a 7-line address bus which is in turn connected to each of nodes 813, 814, 815, 816, 817, 818 and 819.

LSI 905 is connected to LCD module 901 by an 8-line row bus and by a 42-line column bus. Likewise, LSIs 910, 915 and 920 are each respectively connected to LCD modules 902, 903 and 904 by an 8-line row bus and by a 42-line column bus.

Components for apparatus illustrated in FIGS. 3 through 10 are readily available to those skilled in the art, as, for example, the form of the components listed in Table 1 which have been used to construct apparatus according to the present invention.

TABLE I

| Number | Value (in Ω) |
|---|---|
| *Resistors* | |
| 111, 112, 113, 114, 131 | 10 Ω |
| 115, 116, 117, 118, 119, 121, 122 | 4.7 Ω |
| 303, 346 | 220 Ω |
| | 330 Ω |
| 132, 135, 139 | 10 kΩ |
| 367, 553, 352, 373, 503, 507 | 12 kΩ |
| 363, 374 | 22 kΩ |
| 133, 136, 171, 173, 175, 315, 316, 317, 319, 364, 343, 348, 702 | 100 kΩ |
| 179, 318 | 1 M |
| 177 | 10 M |
| 141 | variable, set to about 40,200 Ω |
| 153 | variable, set to about 820 kΩ |
| *Capacitors* | |
| 368 | 0.005 μF |
| 311 | 0.0012 μF |
| 552, 351, 502, 508 | 47 pF |
| 178, 371, 342, 347, 372, 703 | 100 pF |
| 345 | 2.3 μF |
| 382 | 0.012 μF |
| 365, 366 | 0.1 μF |

| Number | Description |
|---|---|
| *Analog Divider* | |
| 160 | Part No. AD535, available from Analog Devices, Norwood, Massachusetts |
| *Operational Amplifiers* | |
| 134, 137 | Part No. TL062, available from Texas Instruments, Houston, Texas |
| 151, 172, 710, 313 | Part No. T2L064, available from Texax Instruments, Houston, Texas |
| *Field Effect Transistors* | |
| 301, 302 | Part no. IFRD110, available from International Rectifier, El Segundo, California |
| *Diodes* | |
| 312, 314 | Part No. 1N4005 |
| *Switching Elements* | |
| 110 | Part No. 71B30-02-1-12NC, available from Grayhill, Inc., LaGrange, Indiana |
| 340, 305, 306, 320 | Quad-switch, Part No. MCI 4066B, available from Motorola, Inc., Semiconductor Product Sector, Phoenix, Arizona |
| 740, 752 | (Type of Part), Part No. 74HC157, available from National Semiconductor, Sunnyvale, California |
| 381 | Part No. 48-llble from C & K Components, Newton, Maryland |
| 530 | (Type of Part), Part No. 71B36-01-2-5NF, available |

TABLE I-continued

| | |
|---|---|
| Multi Vibrators | from Grayhill, LaGrange, Indiana |
| 344, 349, 361, 369, 371, 501, 506, 551 | (Type of Part), Part No. 74HC4538, available from National Semiconductor, Sunnyvale California |
| 341, 353, 751 | D-Type Flip-Flop, Part No. 74HC74, available from National Semiconductor, Sunnyvale, California |
| Logic Elements | |
| 354, 554, 562, 721, 722, 760 | AND gate, Part No. 74HC08, available from National Semiconductor, Sunnyvale, California |
| 723, 724 | NOR gate, Part No. 74HC27, available from National Semiconductor, Sunnyvale, California |
| 510, 563, 725, 726, 727, 728 | NAND gate, Part No. 74HC00, available from National Semiconductor, Sunnyvale, California |
| 729 | AND gate, Part No. 74HC20, available from National Semiconductor, Sunnyvale, California |
| 524, 561, 732, 733, 734, 735, 736, 737, 738, 739, 753 | Digital Invertor, Part No. 74HC04, available from National Semiconductor, Sunnyvale, California |
| 504, 542 | AND gate, Part No. 74HC11, available from National Semiconductor, Sunnyvale, California |
| 541 | NOR gate, Part No. 74HC27, available from National Semiconductor, Sunnyvale, California |
| Counters | |
| 521, 522, 523, 525 | (Type of Part), Part No. 74HC161, available from National Semiconductor, Sunnyvale, California |
| Converters | |
| 701 | A/D Converter, Part No. AD7574, available from Analog Devices, Norwood, Massachusetts |
| 731 | Binary to Decimal Converter, Part No. 74HC138, available from National Semiconductor, Sunnyvale, California |
| Display | |
| 90 | Dot Matrix Liquid Crystal Display, Part No. EGY84320AT, available from Epson America, Inc., Torrance, California |

In the operation of the apparatus as illustrated in FIGS. 3 through 10, nodes indicated in these Figures as being at a given potential, are raised or lowered to that potential by connecting them to a power source (not shown). The +5, −5, LC and AG nodes of FIGS. 3 through 10 are connected to a power source by throwing a power switch (not shown).

Referring now to FIG. 7, when the power is turned on, the potential at the first input of multi-vibrator 361 rises as capacitor 365 is charged through resistor 364. When the triggering threshold of input A of multi-vibrator 361 is exceeded, the Q output of multi-vibrator 361 goes from an initially lower state to a high state and the $\overline{Q}$ output of multi-vibrator 361 goes from an initially high state to a low state while multi-vibrator 361 times out for 10 microseconds, as determined by the RC timing circuit composed of resistor 363 and capacitor 362. As a result of the $\overline{Q}$ output of multi-vibrator 361 going high, the select SEL input of formatting device 740 goes high so that outputs 1Y, 2Y, 3Y and 4Y are respectively connected to inputs 1B, 2B, 3B and 4B, which are tied to +5 volts. Because the outputs of formatting device 740 are high, nodes 806, 805, 816 and 813 are high.

Also as a result of the $\overline{Q}$ output of multi-vibrator 16 going high, the first input A of multi-vibrator 369 goes high as capacitor 368 charges through resistor 367. The rising potential at input A of multi-vibrator 369 triggers multi-vibrator 369 so that the $\overline{Q}$ output goes low during the 5-microsecond timing out period set by the RC timing circuit composed of resistor 374 and capacitor 371. Because one of its inputs is therefore low, the output of gate 760 is low which causes node 808 to be low.

Turning now to FIG. 10, it may be seen that all $\overline{RD}$ inputs of chips 905, 910, 915 and 920 are tied high and therefore these chips read any signal applied to their inputs. Thus, because node 808 is high as a result of initialization control 360, and because the only input data is in the form of the high signals applied at nodes 805, 806, 813 and 816, chips 905, 910, 915 and 920 are caused to write such data to display modules 901, 902, 903 and 904 that the screen appears blank.

The high signal at node 420 also prevents the strobing of display quadrant select 750 by keeping its low-active strobe input STR at a high level.

Referring now to FIG. 8, the high signal at the second lead of capacitor 342 causes a low signal on its first lead and consequently on the low-active SET input of flip-flop 341. This initializes flip-flop 341 so that its $\overline{Q}$ output is high.

In FIG. 9, the second input of AND gate 504 is tied to a low level of node 421. Although the $\overline{Q}$ output of multi-vibrator 501 and thus the first input of AND gate 504 are high, the output of AND gate 504 is low because at least one of its inputs is low. Thus, the A input of multi-vibrator 506 is maintained at a low level, so that the $\overline{Q}$ output of multi-vibrator 506 remains low. Therefore, during the timing out of multi-vibrator 361, oscillator 500 remains in an "OFF" condition.

The low level of the $\overline{Q}$ output of multi-vibrator 361 is applied to the active-low CLR inputs of flip-flops 341 and 353 in FIG. 8. The signal initializes these flip-flops in preparation for testing a geophone.

The low level of the $\overline{Q}$ output of multi-vibrator 361 is also applied to the first input of NOR gate 559. Because the second input of NOR gate 559 is also low due to the initially low state of $\overline{Q}$ output of multi-vibrator 551 to which it is attached, the low-active output of OR gate 559 goes low. Node 620, which is connected to the output of OR gate 559, and, as shown in FIG. 9, the CLR inputs of counters 521, 522, 523 and 525 goes low. Because their low-active CLR inputs go low, each of counters 521, 522, 523 and 525 is initialized so that all of its outputs are at a low or zero state. The second input of OR gate 559 is low because at least some of the inputs of AND gate 542, which are connected to $\overline{Q}$ outputs of counters 523 and 525, so that the output of AND gate 542 is low. As a result, the second input of AND gate 543 is low and its low-active output goes high as a result because at least one of its inputs is low. Because the low-active output of AND gate 543 goes high, node 610 and hence the A input of multi-vibrator 551, as shown in FIG. 7, goes high so that the $\overline{Q}$ output of multi-vibrator 551 goes low as does the second input of OR gate 559.

When multi-vibrator 369 times out, its $\overline{Q}$ output goes high so that flip-flops 341 and 353 are not held in a clear state but are free to respond to their inputs. Likewise, because the $\overline{Q}$ output of multi-vibrator 361 applies a high level input to OR gate 559, so that the output of OR gate 559 and hence node 620 are held in a low state such that counters 521, 522, 523 and 525 are not held in a clear state but are free to respond to their inputs. The return of the $\overline{Q}$ output of multi-vibrator 361 also applies a high level signal to the input of AND gate 504 by way of node 410. In this condition, the output of AND gate 504 will go high whenever the $\overline{Q}$ output of multi-vibrator 501, which is tied to its first, input goes high. Consequently, the alternate timing out of multi-vibrators 501 and 506 results in a signal at node A, as shown in FIG. 11, having a period equal to twice the 0.9766 microseconds cycle time of either multi-vibrator 501 or multi-vibrator 506. Thus, the period of the signal at node A is 1.93 microseconds corresponding to a frequency of 512 KHz. From this point until the power is shut off, oscillator 500 cycles as indicated for node A.

The falling of the $\overline{Q}$ output of multi-vibrator 361 to a low level drops the level of the SEL input of switch 740. Because the low-active STR input of switch 740 is tied low to logic common, the low level of the SEL input of switch 740 causes outputs 1Y, 2Y, 3Y, and 4Y to be respectively connected to inputs 1A, 2A, 3A, and 4A. The low level of the $\overline{Q}$ output of multi-vibrator 361 enables the STR input of switch 752 so that it is no longer presented from switching in response to the level of its SEL input.

RESISTANCE AND IMPULSE TEST

Turning now to FIG. 8, when contact 381 of impulse switch 380 is moved from its position as shown in FIG. 8 to connect the second lead of capacitor 382 with the SET input of flip-flop 341, a resistance and an impulse test are begun. The SET input flip-flop 341 is normally high because capacitor 342 charges to +5 volts through the high valued resistor 343. Connecting flip-flop 341 to capacitor 382 causes the Q output of flip-flop 341 at node 200 which is connected to it, to go high. Correspondingly, the $\overline{Q}$ output of flip-flop 341 and node 210 which is connected to it, goes low.

Turning now to FIG. 3, the low level of node 210 is applied to the input of quad switch 304 and at the input of quad switch 306. The low input of quad switch 306 keeps this switch closed while a voltage is being applied to the geophone coil. The low input of quad switch 304 prevents input from being applied to geophone signal preamplifier 170 while the coil is lifting within a geophone attached to geophone input 100.

High level of node 200 causes the gate electrodes of FETs 301 and 302 to be high so that they begin to conduct. The high level of node 200 also results in a high input level for quad switch 305, causing quad switch 305 to be in an open condition and to permit an output voltage from divider 160 to be applied through node 230 and, as shown in FIG. 5, buffer amplifier 710, to the analog A input of A/D converter 701.

Because FETs 301 and 302 are conducting, a geophone having a "high" cable connected to input terminal 101 and having a "low" cable connected to input terminal 102 will help to provide a path for current between the source of potential at +5 volts connected to the second lead of resistor 303 through FET 302 and across the voltage divider formed respectively on the one hand by the resistance in the series of resistors within geophone drive switch 110, and, on the other hand, by resistor 131 through FET 301 and the geophone attached to terminals 101 and 102 to the node at analog ground connected to terminal 102. As is inherent in this arrangement, the fewer resistors in the series 111 through 122 between contact 123 and analog ground, the lower the voltage that offsets the geophone coil. By moving contact 123 to vary the number of these resistors, the amplitude of the waveform displayed may be adjusted.

While a voltage is being applied to offset the geophone coil, the voltage at geophone input 100 is sensed by voltage sense amplifier 150 at the non-inverting input of operational amplifier 151 and the current passing through terminal 101 is sensed by current sense amplifier 130 as the current passing through resistor 131. Amplifiers 150 and 130 are conventional in construction and will not be discussed further, except to note that when calibrating the apparatus in FIG. 3, the D input to divider 160 is adjusted to 0.1 volts DC by adjusting variable resistor 141 and the level of the output of divider 160 is set at a base line of 0 volts by adjusting variable resistor 153. The voltage across and current passing through the geophone being tested, as respectively sensed by amplifiers 150 and 130, are respectively applied as voltage levels to the N and D inputs of divider 160. The resulting level at the output of divider 160 is applied through switch 305, node 230 and buffer amplifier 710 to the analog input A of A/D divider 701 in FIG. 4 as an indication of the resistance of the geophone being tested.

Turning now to FIG. 8, the high level of the Q output of flip-flop 341 resulting from the closing of impulse switch 380, also applies a high level to input A of multi-vibrator 344. The timing circuit composed of capacitor 345 and resistor 346 is used to set multi-vibrator 344 to time out at 500 milliseconds, a period empirically determined to be a period sufficient to completely raise the coil of a geophone. The high level of its A input triggers multi-vibrator 344 so that its Q output goes high. The high level of the Q output of multi-vibrator 344 pulls the low-active B input of multi-vibrator 349 low through node M and across capacitor 347 thereby triggering multi-vibrator 349. Other than when triggered by multi-vibrator 344, the B input of multi-vibrator 349 is maintained in a high state by the charging of capacitor 347 through resistor 348 from a node at the +5 volts. Multi-vibrator 349 times out in one microsecond and during that time, the $\bar{Q}$ output of multi-vibrator 349 is low. The low level of $\bar{Q}$ output of multi-vibrator 349 is applied to the low-active SET input of flip-flop 353, causing its Q output to go high and through node 440 to clear flip-flop 751 through its low-active CLR input, as found in FIG. 7. The clearing of flip-flop 751 causes its Q output to go low, resulting in the SEL input of 8-to-4 chip 752 going low. Because the SEL input of chip 752 is low, inputs 1A, 2A, 3A and 4A are respectively connected to outputs 1Y, 2Y, 3Y and 4Y.

Returning now to FIG. 8, the setting of flip-flop 353 causes its Q output to go high and causes this high level output to be applied to node 430 to the first input of AND gate 510 in FIG. 9 and as illustrated in FIG. 11. The relationship between the low level of signal at node M, the high level of signal at node 430 and the transient (one millisecond) low going pulse at 440 is illustrated in FIG. 14. Because at least the first input of AND gate 510, which is tied to node 430, is high, each time node A goes high as a result of the action of multi-vibrator 506, the output of AND gate 510, and consequently node CL, goes high, as shown in FIG. 11.

Because the output of counter 521 clocks counters 522, 523 and 525 and hence clocks display 900, selection of the output of counter 521 used to clock counters 522, 523 and 525 provides a means of selecting the frequency scale of display 900. Specifically, if contact 531 in frequency scale switch 530 is connected to node CL, the "TAP" setting, display will be clocked at the rate of oscillator 500, that is at a period of 1.93 microseconds, so that each dot on the matrix display 900 represents 0.125 milliseconds on a frequency scale. Similarly, if contact 531 is connected to node B, a period of 3.91 microseconds results so that each dot on the display 900 represents 0.25 milliseconds. If contact 531 is connected to node C, a period of 7.18 microseconds results in each displayed dot representing 0.5 milliseconds; if contact 531 is connected to node D, a period of 15.63 microseconds results in each dot representing 1 milliseconds in time on the frequency scale; and, if contact 531 is connected to node E, a period of 31.25 microseconds results in each dot on display 900 representing 2 milliseconds in time on the frequency scale. This means that connection of contact 531 to node B properly displays a 50 to 75 Hz geophone so that connection to node E is most useful for low frequency work, connection to node D is convenient for most geophones and connection to node C is useful for high frequency geophones. The relationship between the signals at nodes B, C, D and E is illustrated in FIG. 11.

Taking the connection of contact 531 to node E as an example, the relative relationships of the signal at node E and the signals at nodes F, G, H, and J, corresponding to the outputs of counter 522, are illustrated in FIG. 12 on a narrower scale than is found in FIG. 11. Similarly, in FIG. 13, on a narrower scale than is found in FIG. 12, the signal at node J may be compared with the signals at nodes connected to the first two outputs of counter 523, 280 and 285, and the respective inverses, 818 and 400, and with the last two outputs of counters 523, 815 and 817.

In FIG. 14, it is also shown that the Q output of flip-flop 341, and hence node 200, fall after one complete cycle at node 815, corresponding to $Q_3$ output of counter 523. Within those two clock cycles, write gate 760 receives a clock low level input from write logic 560 and write twice to LCD display 900. Write logic 560 is cycled by a low level signal at node G and high level signals at node H and J as respectively applied to converter 561 and AND gate 562 to produce two high inputs to which has a low-active output so that its AND gate 562 output is low.

What is written during these first two cycles is the output of A/D converter 701 which reflects the resistance measurement applied at its A input. Thus, because each half cycle of node 815 represents one dot on display, the first two dots written to the left most side of the display are at the same height on the display and provide the resistance measurement. The $Q_1$ and $Q_2$ outputs of counter 523 and the $D_1$ and $D_2$ outputs of A/D converter 701 are respectively applied to nodes 280, 285, 255 and 260. As applied to the logic network of address logic 720, the signal level at these nodes is ultimately used to gate the gating G input of binary digital converter 731. The $D_3$, $D_4$ and $D_5$ outputs of A/D converter 701 are applied to the A, B, C inputs of binary-to-digital converter 731 and are gaited by the G input of converter 731, they appear in decimal form at nodes 800 to 807. The signals at nodes 800 through 807 are applied in turn to chips 915, 905, 910 and 920 as determined by the level of $\overline{CS}$ input of each of these chips. These $\overline{CS}$ inputs are connected to the outputs of 8-2-4 switch 752 shown here in FIG. 7. The chip select $\overline{CS}$ inputs are rotated sequentially through four combinations of levels by the changing level of the signal at node 285 as transmitted directly or through converter 753 from the $Q_2$ output of counter 523, and by the change of levels of node K due to the change in signal level at the Q output of flip-flop 751. The respective logic level signals at node 810, 809, 812 and 811 required to select in order chips 905, 910, 915 and 920 are: 0, 1, 1 and 1; 1, 0, 1 and 1; 1, 1, 0 and 1; and, 1, 1, 1 and 0. The signals which cause the different chips to be selected are illustrated in FIG. 14 for nodes 610, L and K. The level of signal at nodes 610 is the result of applying the output of counter 525 to the logic elements of reset logic 540 and as a result of the triggering of multi-vibrator 551, counters 521, 522, 523 and 525 are reset through OR gate 559 and node 620. The $Q_4$ output of counter 523 also clocks flip-flop 341 through node 817. As a result, node 200 goes low and node 210 goes high, so that FETs 301 and 302 cease to conduct and quad switch 305 closes. Because these actions disconnect the geophone connected to terminals 101 and 102 from the source of potential of +5 volts, the geophone coil falls.

In addition, the high level signal at node 210 as applied to the inputs of quad switches 304 and 306 connect terminal 101 through geophone signal preamplifier 170 and node 230 to A/D converter 701. Thus, after the first two cycles of the signal at 815, it is the falling geophone coil which produces a signal as applied through preamplifier 170 which is passed through the circuit elements to the display 900. Thus, 82 of the 84 columns of the display are dedicated to a waveform produced by the falling of the geophone coil during an impulse test.

The display of a typical combination of resistance and impulse test is illustrated in FIGS. 15. As illustrated in FIG. 15, on the face plate 940 of a geophone tester according to the present invention, a geophone drive switch is set to connect contact 123 to the first lead of resistor 119. This is indicated by the selection of four on a geophone drive dial 941. Banana plug jacks 942 are illustrated for connection to inputs 101 and 102. A depressable impulse switch 944 is shown on the face plate 540 as is a switch 945 for applying power to the circuit elements of the apparatus according to the present invention. The results of pressing impulse switch 944 are shown on display plate 950. A vertical resistance scale at the left of the LCD display allows an approximate reading of the resistance of a geophone attached to jacks 942 based upon the position of the first two dots at the left of the display. As indicated along the right vertical margin of the LCD display, at 154, the amplitude of a waveform produced by a falling geophone coil is related to the height of waveform displayed. As indicated earlier, this amplitude may be adjusted by manipulating knob 941. A frequency scale knob 943 is set at a first position, connecting contact 531 to node E. The frequency scale knob may be adjusted in order to control the left to right spread of the display of the waveform and bring it within the scale of the display.

The result of testing a properly operating geophone is illustrated in FIG. 15. A smooth waveform, that is having no spikes, and a correct resistance indicated along scale 952, indicate that the geophone is properly operating. A more definite determination may be made by tracing the waveform from a geophone known to be operating properly on the surface of clear plastic display plate 950 or by storing such a waveform in memory (not shown). This tracing is then used as a comparator. Geophones of the same type produce a substantially identical waveform when operating properly. Testing of geophones with known defects, such as a dragging coil, provides a library of known geophone response which allows a specific geophone defect to be diagnosed based upon the shape of or irregularities in the waveform displayed.

"TAP" TEST

If a geophone connected across terminals 101 and 102 is tapped on either its top or bottom surface, a "tap" test may be performed. Because node 210 in FIG. 3 is high if the power is turned on and if the impulse switch has not been depressed, geophone signal preamplifier 170 is thus normally connected to A/D converter 701. The output of preamplifier 170 is also connected to node 220 which, upon application of a sharp tap, produces a pulse through the conventional full wave rectifier and high pass amplifier of tap trigger control 310. Unless the impulse switch has been depressed, because node 200 is low, quad switch 321 is closed and the output of tap trigger control 310 is connected to node 240. The level of signal at node 240 is applied to multi-vibrator 349, which cycles as described above for the impulse test. Nevertheless, in a tap trigger test, because multi-vibrator 341 is not triggered, all dots on the display represent points on a waveform generated by the tapping of the geophone, including the left-most two dots.

In FIGS. 16 and 17 the same reference numerals used in FIG. 15 identify the identical structures; FIG. 16 illustrates the result to be expected from tapping the top of a geophone. The first break of the waveform should be upward, as opposed to the result of tapping the bottom of the geophone in which, as shown in FIG. 17 the first break of the waveform should be negative.

While the present invention has been described in terms of a preferred embodiment, further modifications and improvements willoccur to those skilled in the art. I desire it to be understood, therefore, that this invention is not limited to the particular form shows in that I intend in the appended claims to cover all such equivalent variations which come within the scope of the invention as claimed.

What is claimed is:

1. Apparatus for testing the polarity of a geophone having a top and a bottom comprising:
   means for measuring the response of a geophone to an applied electrical stimulus and a mechanical impulse to the top or the bottom of the geophone;
   means, coupled to said means for measuring and to a means for controlling the display of a waveform representation of geophone response data, for timing the measurement and display of geophone response data;
   means, coupled to said means for measuring, for storing geophone response data for the extruded or delayed display thereof;
   a waveform display coupled to said means for storing;
   means for adjusting a left to right spread; and
   means for adjusting an amplitude operably connected to said waveform display, so that it can be determined whether the displayed waveform has a first break that is negative going or is positive going.

2. A method for testing the polarity of a geophone comprising the steps of:
   connecting a geophone having a top and a bottom to a geophone tester having a waveform display capable of storing and of extended display of geophone response data; applying a selected electrical stimulus to the geophone;
   applying a mechanical impulse to the top or to the bottom of the geophone;
   displaying a waveform of the response of the geophone to the selected stimulus and impulse; and
   determining whether the displayed waveform has a first break that is negative going or is positive going.

3. The method of claim 2, further comprising the step of comparing the waveform to a representation of a properly operating geophone response waveform.

* * * * *